United States Patent
Miyashita

(10) Patent No.: US 12,337,386 B2
(45) Date of Patent: Jun. 24, 2025

(54) METHOD FOR PREPARING ADDITIVE MANUFACTURING PROGRAM, METHOD FOR ADDITIVE MANUFACTURING, AND ADDITIVE MANUFACTURING APPARATUS

(71) Applicant: Sodick Co., Ltd., Kanagawa (JP)

(72) Inventor: Yasuyuki Miyashita, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 192 days.

(21) Appl. No.: 17/874,246

(22) Filed: Jul. 26, 2022

(65) Prior Publication Data

US 2023/0132245 A1 Apr. 27, 2023

(30) Foreign Application Priority Data

Oct. 25, 2021 (JP) ................................. 2021-173787

(51) Int. Cl.
  *B22F 10/38* (2021.01)
  *B22F 10/28* (2021.01)
  (Continued)

(52) U.S. Cl.
  CPC ............ *B22F 10/385* (2021.01); *B22F 10/28* (2021.01); *B22F 10/40* (2021.01); *B22F 10/85* (2021.01);
  (Continued)

(58) Field of Classification Search
  CPC ........ B22F 10/385; B22F 10/28; B22F 10/40; B22F 10/85; B22F 12/41; B22F 12/53;
  (Continued)

(56) References Cited

U.S. PATENT DOCUMENTS 10,259,163 B2 * 4/2019 Eilken .................. B29C 64/386
2020/0269352 A1 * 8/2020 Maurer ................ B23K 26/082
(Continued)

FOREIGN PATENT DOCUMENTS

CN 112706400 4/2021
EP 3127635 2/2017

OTHER PUBLICATIONS

Van de Ven E, Maas R, Ayas C, Langelaar M, van Keulen F. Continuous front propagation-based overhang control for topology optimization with additive manufacturing. Structural and Multidisciplinary Optimization. May 2018;57:2075-91. (Year: 2018).*
(Continued)

*Primary Examiner* — Eunhee Kim
(74) *Attorney, Agent, or Firm* — JCIPRNET

(57) ABSTRACT

A method for preparing an additive manufacturing program includes a loading step, a dividing step, an overhang calculating step, a subdividing step, a maintaining step, and an outputting step. In the loading step, a three-dimensional model is loaded. In the dividing step, the three-dimensional model is divided into divided layers. In the overhang calculating step, an overhang angle or overhang length of the divided layer is calculated. In the subdividing step, at least a part of the divided layer including an overhang portion is subdivided into two or more in a lamination direction. In the maintaining step, neither subdivision of the divided layer nor addition of a support structure supporting the divided layer is performed. The subdividing step and the maintaining step are selectively performed based on the overhang angle or overhang length. In the outputting step, an additive manufacturing program defining a command pertaining to additive manufacturing is output.

10 Claims, 16 Drawing Sheets

(51) Int. Cl.
| | |
|---|---|
| *B22F 10/40* | (2021.01) |
| *B22F 10/85* | (2021.01) |
| *B22F 12/41* | (2021.01) |
| *B22F 12/53* | (2021.01) |
| *B22F 12/67* | (2021.01) |
| *B33Y 10/00* | (2015.01) |
| *B33Y 30/00* | (2015.01) |
| *B33Y 50/02* | (2015.01) |
| *G06F 30/17* | (2020.01) |
| *G06F 113/10* | (2020.01) |

(52) U.S. Cl.
 CPC .............. *B22F 12/41* (2021.01); *B22F 12/53* (2021.01); *B22F 12/67* (2021.01); *B33Y 10/00* (2014.12); *B33Y 30/00* (2014.12); *B33Y 50/02* (2014.12); *G06F 30/17* (2020.01); *G06F 2113/10* (2020.01)

(58) Field of Classification Search
 CPC .......... B22F 12/67; B22F 10/80; B33Y 10/00; B33Y 30/00; B33Y 50/02; B33Y 50/00; G06F 30/17; G06F 2113/10; Y02P 10/25
 See application file for complete search history.

(56) References Cited

U.S. PATENT DOCUMENTS

| | | | |
|---|---|---|---|
| 2020/0269509 A1* | 8/2020 | Hamaguchi | B22F 10/80 |
| 2021/0252787 A1* | 8/2021 | Shin | B29C 64/40 |

OTHER PUBLICATIONS

Zhang K, Cheng G, Xu L. Topology optimization considering overhang constraint in additive manufacturing. Computers & Structures. Feb. 1, 2019;212:86-100. (Year: 2019).*

Van de Ven E, Maas R, Ayas C, Langelaar M, van Keulen F. Overhang control in topology optimization: a comparison of continuous front propagation-based and discrete layer-by-layer overhang control. Structural and Multidisciplinary Optimization. Aug. 2021;64: 761-78. (Year: 2021).*

* cited by examiner

METHOD FOR PREPARING ADDITIVE MANUFACTURING PROGRAM, METHOD FOR ADDITIVE MANUFACTURING, AND ADDITIVE MANUFACTURING APPARATUS

CROSS-REFERENCE TO RELATED APPLICATIONS

This application claims the priority benefit of Japan Application No. 2021-173787, filed on Oct. 25, 2021. The entirety of the above-mentioned patent application is hereby incorporated by reference herein and made a part of this specification.

BACKGROUND

Technical Field

The disclosure relates to a method for preparing an additive manufacturing program, a method for additive manufacturing in which additive manufacturing is performed based on the additive manufacturing program prepared by the method for preparing an additive manufacturing program, and an additive manufacturing apparatus that performs the method for additive manufacturing.

Related Art

An additive manufacturing apparatus generally operates in accordance with an additive manufacturing program prepared by a computer-aided manufacturing (CAM) device and manufactures a desired three-dimensional object. The additive manufacturing program defines a command pertaining to formation of a material layer and formation of a solidified layer for each divided layer obtained by dividing the desired three-dimensional object at a predetermined lamination pitch.

For example, in an additive manufacturing apparatus that performs powder bed fusion, for each divided layer, a material layer is formed in a build region being a region for forming a desired three-dimensional object, and the material layer is irradiated with a laser beam or an electron beam to form a solidified layer. Then, the formation of the material layer and the formation of the solidified layer are alternately repeated, and the three-dimensional object being a laminate of a plurality of solidified layers is formed.

In the three-dimensional object, an overhang portion may be present which is a portion overhanging from the solidified layer directly underneath. Since the overhang portion is likely to be deformed because of its own weight or thermal contraction, a support structure for supporting the overhang portion may be added as necessary. US Patent Laid-Open No. US2020/0269509A1 discloses a CAM device that adds an appropriate support structure in consideration of a mechanical quantity.

The support structure must be removed after additive manufacturing, and the removal takes time and effort. In addition, an excess material is required to manufacture the support structure, and manufacturing time is lengthened by the time required for manufacturing the support structure. Hence, it is desirable that the support structure be reduced without hindering manufacturing.

Whether the support structure is required for a predetermined divided layer directly depends on an overhang length being a horizontal length of the overhang portion in said divided layer. The overhang length is determined by an overhang angle being an inclination angle of the overhang portion, and a thickness of the divided layer, that is, a lamination pitch. By reducing the overhang length, the possibility of manufacturing without a support structure increases.

If the lamination pitch is reduced, the overhang length in each divided layer can be reduced. However, as the lamination pitch is reduced, the number of divided layers increases. Thus, the formation of the material layer and the solidified layer inevitably takes relatively much time, and the manufacturing time may increase.

SUMMARY

According to the disclosure, a method for preparing an additive manufacturing program is provided including the following. In a loading step, a three-dimensional model pertaining to a desired three-dimensional object is loaded. In a dividing step, the three-dimensional model is divided into a plurality of divided layers at a normal lamination pitch of a predetermined size in a lamination direction. In an overhang calculating step, an overhang angle or an overhang length is calculated with respect to each of the plurality of divided layers, the overhang angle being an inclination angle of an overhang portion being a portion horizontally protruding with respect to the divided layer directly underneath, the overhang length being a horizontal length of the overhang portion. In a subdividing step performed when the overhang angle of a predetermined divided layer is less than a first angle threshold or the overhang length of the predetermined divided layer is equal to or greater than a first length threshold, at least a part of the divided layer including the overhang portion is subdivided into two or more in the lamination direction. In a maintaining step performed when the overhang angle of the predetermined divided layer is equal to or greater than the first angle threshold or the overhang length of the predetermined divided layer is less than the first length threshold, neither subdivision of the divided layer nor addition of a support structure supporting the divided layer is performed. In an outputting step, an additive manufacturing program is output in which a command pertaining to additive manufacturing is defined based on a shape of each divided layer.

DESCRIPTION OF THE EMBODIMENTS

The disclosure provides a method for preparing an additive manufacturing program in which, by subdividing only at least a part of a specific divided layer based on an overhang angle or an overhang length, a support structure can be reduced without excessively increasing manufacturing time.

In the method for preparing an additive manufacturing program of the disclosure, a maintaining step in which subdivision is not performed or a subdividing step in which subdivision is performed is selectively performed based on the overhang angle or the overhang length. Accordingly, since only the divided layer that requires subdivision is subdivided, the support structure can be reduced without excessively increasing the manufacturing time.

Hereinafter, an embodiment of the disclosure will be described using drawings. The various modifications described below may be implemented in any combination.

Figure 1:
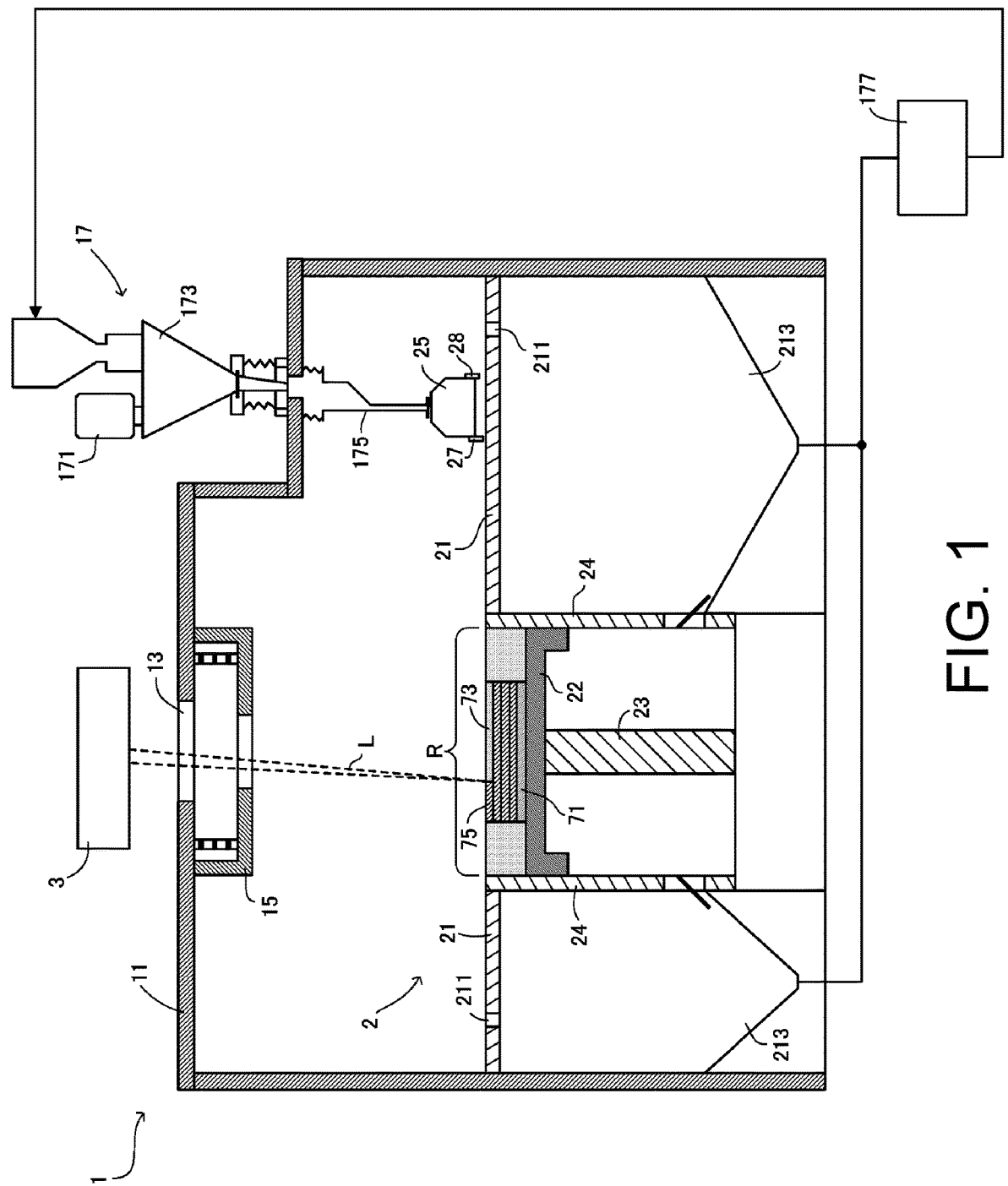
FIG. 1 is a schematic configuration view of an additive manufacturing apparatus.

First, an additive manufacturing apparatus 1 is described. The additive manufacturing apparatus 1 performs additive manufacturing in accordance with an additive manufacturing program prepared by a CAM device 5. Specifically, the additive manufacturing apparatus 1 of the present embodiment illustrated in FIG. 1 is an apparatus that performs powder bed fusion, in which a material layer forming step of forming a material layer 73 and a solidified layer forming step of forming a solidified layer 75 are alternately repeated to manufacture a desired three-dimensional object. The additive manufacturing apparatus 1 includes a chamber 11, a material layer former 2, an irradiator 3, and a controller 4.

The chamber 11 is configured to be substantially sealed and covers a build region R being a region where the desired three-dimensional object is formed. During manufacturing, the chamber 11 is supplied with an inert gas from an inert gas supply device (not illustrated), and the chamber 11 is filled with the inert gas having a predetermined concentration. The inert gas supply device is, for example, an inert gas generator that generates an inert gas from the air, or a gas cylinder in which an inert gas is stored. The inert gas containing a fume generated during formation of the solidified layer 75 is discharged from the chamber 11. It is desirable that the inert gas discharged from the chamber 11 have the fume removed therefrom by a fume collector (not illustrated) and be then returned into the chamber 11. The fume collector includes, for example, an electrostatic precipitator or a filter. The inert gas is a gas that does not substantially react with the material layer 73 or the solidified layer 75, and is appropriately selected from nitrogen gas, argon gas, helium gas and the like according to the type of material.

The material layer former 2 is provided in the chamber 11 and forms the material layer 73 of a desired thickness on the build region R. The material layer former 2 includes a base 21, a build table 22, a recoater head 25, a first blade 27, and a second blade 28.

The base 21 includes the built region R. An excess material storage tank 213 is provided below the base 21, and a discharge opening 211 communicating with the excess material storage tank 213 is formed in the base 21. An excess material distributed on the base 21 during formation of the material layer 73 is extruded by the first blade 27 or the second blade 28 as the recoater head 25 moves. The excess material falls from the discharge opening 211 and is stored in the excess material storage tank 213.

The build table 22 is arranged in the build region R and is configured to be vertically movable by a build table driving device 23 having any actuator. By the build table 22 and tank walls 24 surrounding the build table 22, an unsolidified material is held. An opening communicating with the excess material storage tank 213 may be formed below the tank wall 24. After completion of manufacturing, by positioning the build table 22 in a position lower than the opening, the unsolidified material is discharged to the excess material storage tank 213. At the time of manufacturing, a base plate 71 may be placed on the build table 22.

The recoater head 25 is arranged on the base 21 and is configured to be horizontally reciprocable on the build table 22 by a recoater head driving device 26 having any actuator. The first blade 27 and the second blade 28 are respectively attached to both side surfaces of the recoater head 25.

Figure 2:
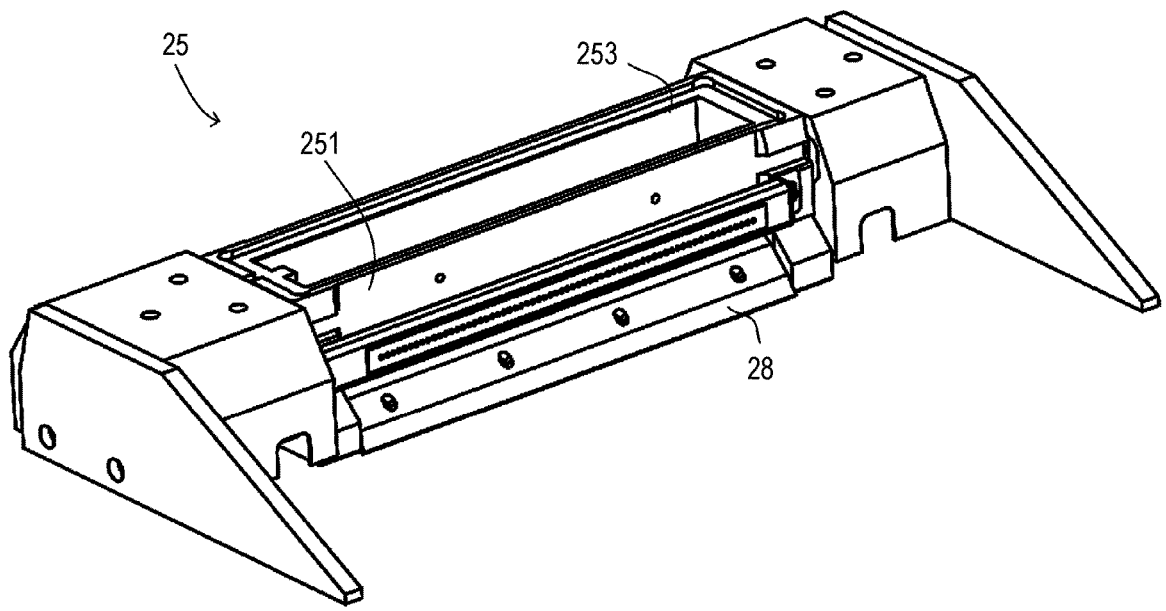
FIG. 2 is a perspective view of a recoater head.
Figure 3:
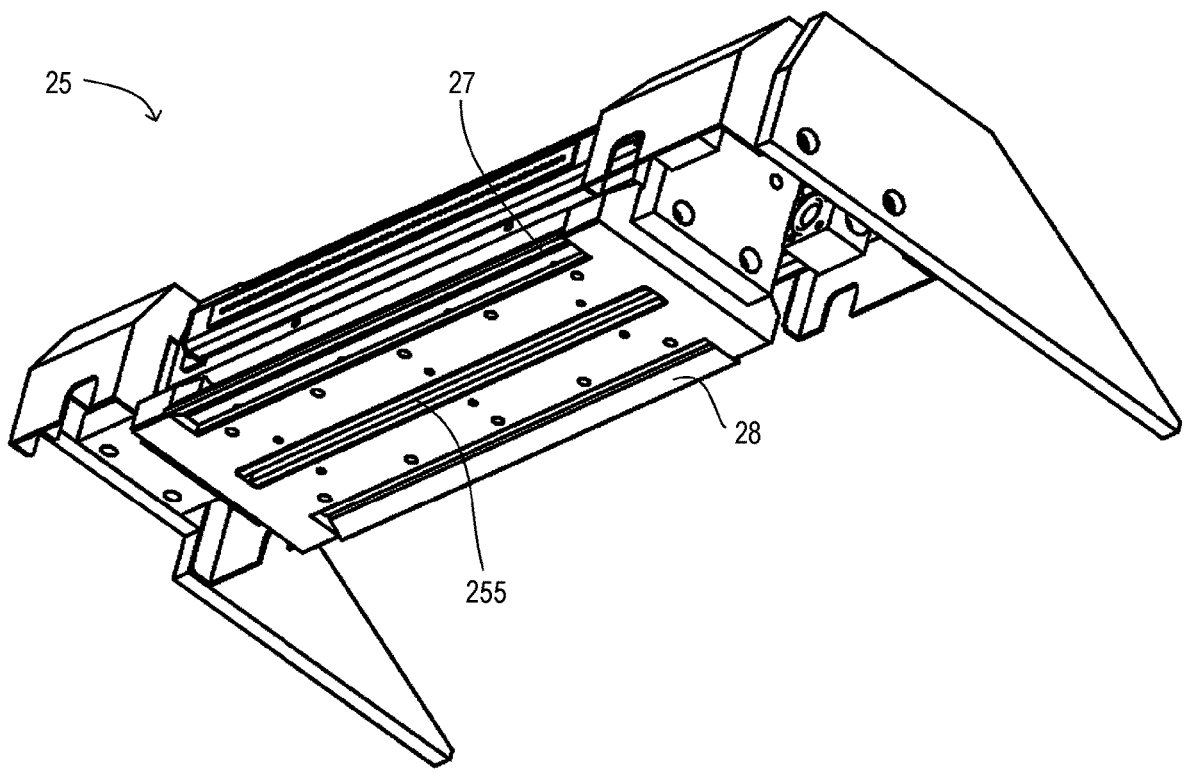
FIG. 3 is a perspective view of the recoater head.

In the present embodiment, the recoater head 25 is configured to be movable while discharging a material stored inside. As illustrated in FIG. 2 and FIG. 3, the recoater head 25 includes a material container 251, a material supply port 253, and a material discharge port 255. The material container 251 contains a powder material. More specifically, as the material, metal powder, ceramic powder or the like is used. The material supply port 253 is provided on an upper surface of the material container 251 and serves as a receiving port for the material supplied from a material supply device 17 to the material container 251. The material discharge port 255 is provided on a bottom surface of the material container 251 and discharges the material in the material container 251. The material discharge port 255 has a slit shape and extends in a horizontal direction orthogonal to a movement direction of the recoater head 25.

The material supply device 17 is a device replenishing the recoater head 25 with the material. The material supply device 17 of the present embodiment includes a material bottle 171 in which the material is stored, a hopper 173 receiving the material supplied from the material bottle 171, and a duct 175 connected to the hopper 173 and guiding the material to the recoater head 25. The material stored in the excess material storage tank 213 is transferred by a transport device such as a vacuum conveyor and subjected to removal of impurities by a classifier 177, followed by being sent to the hopper 173. The classifier 177 is, for example, a three-dimensional sieve or an ultrasonic sieve. The material supplied from the material bottle 171 and the material collected from the excess material storage tank 213 pass through the hopper 173 and the duct 175 and are dropped to the recoater head 25. The material supply device 17 is not limited to the above configuration if it is configured to be able to replenish the recoater head 25 with the material at any time.

The recoater head 25 moves between a first position and a second position set across the build region R. Here, the side facing the second position of the recoater head 25 is taken as a first side surface, and the side facing the first position of the recoater head 25 is taken as a second side surface. The first blade 27 is attached to the first side surface of the recoater head 25. The second blade 28 is attached to the second side surface of the recoater head 25. The first blade 27 and the second blade 28 are, for example, flat plate-shaped members, and may have other shapes such as a brush shape. Here, the second blade 28 is provided so that a lower end of the second blade 28 is located higher than a lower end of the first blade 27 and lower than the material discharge port 255.

If the lower end of the first blade 27 and the lower end of the second blade 28 are at the same height, whether the recoater head 25 is moved from the first position to the second position or is moved from the second position to the first position, the thickness of the material layer 73 ought to be same in theory. However, because of inevitable attachment error, it is difficult to set the lower end of the first blade 27 and the lower end of the second blade 28 at completely the same height. As will be described later, in the present embodiment, the thickness of the material layer 73 may become relatively small, and the influence of an error in thickness of the material layer 73 becomes relatively large. In the case where a blade is provided only on one side surface of the recoater head 25 configured to be able to discharge the material stored inside, there is a possibility that the material may undesirably leak from a side where no blade is provided. Accordingly, in the present embodiment, a material is leveled by the second blade 28 to have a thickness greater than the desired thickness, and then the material is further leveled by the first blade 27, and the material layer 73 of the desired thickness is formed. The first blade 27 serves to form the material layer 73 of the desired thickness, and the second blade 28 serves to limit the amount of the material discharged from the recoater head 25.

Figure 4:
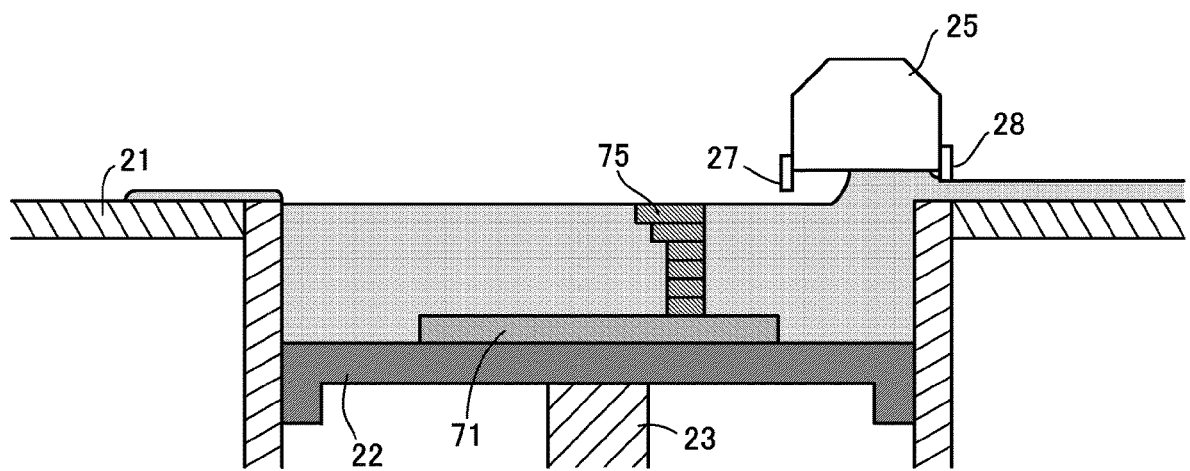
FIG. 4 is an explanatory view of a material layer forming step.
Figure 5:
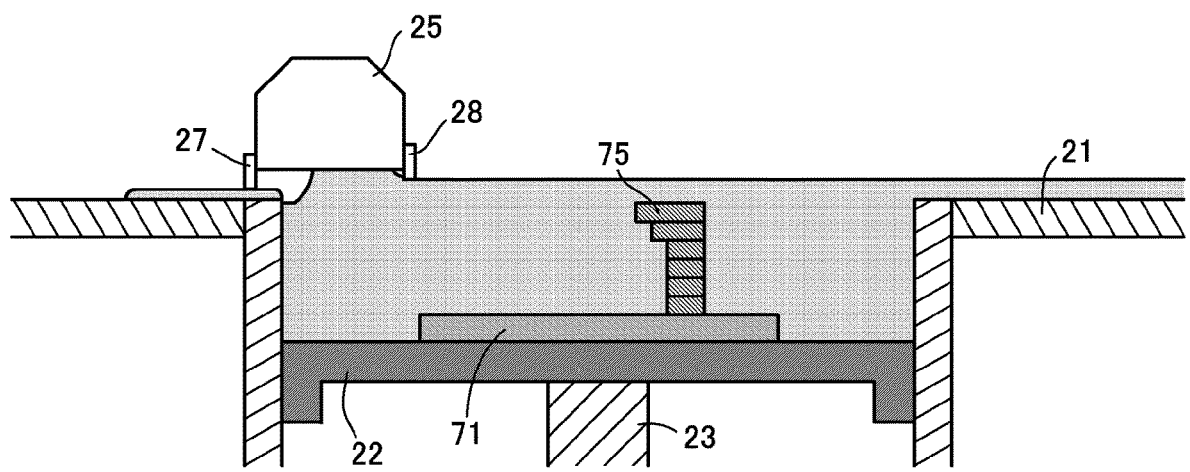
FIG. 5 is an explanatory view of the material layer forming step.
Figure 6:
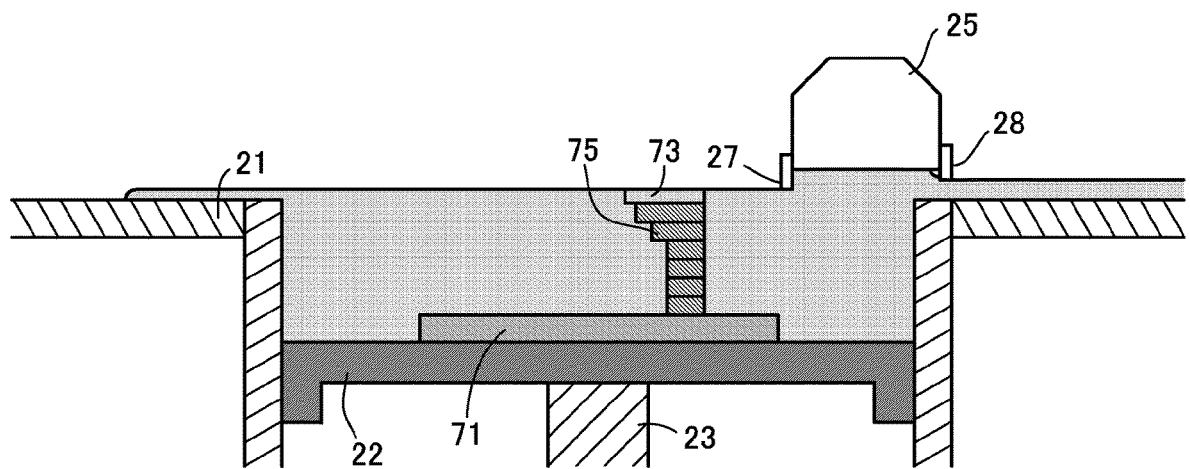
FIG. 6 is an explanatory view of the material layer forming step.

Here, operation in a material layer forming step in forming one material layer 73 will be described with reference to FIG. 4 to FIG. 6. In FIG. 4 to FIG. 6, the first side surface to which the first blade 27 is attached is the left side surface of the recoater head 25, the second side surface to which the second blade 28 is attached is the right side surface of the recoater head 25, the first position is on the right side of the build region R, and the second position is on the left side of the build region R.

At the time of forming the material layer 73 of the desired thickness, the build table 22 is set at an appropriate height. At the start of the material layer forming step, the recoater head 25 is located in the first position.

First, the recoater head 25 is moved from the first position to the second position. FIG. 4 and FIG. 5 illustrate the recoater head 25 during movement from the first position to the second position. At this time, the material discharged from the material discharge port 255 of the recoater head 25 is leveled by the second blade 28. A thickness of a layer of the material leveled by the second blade 28 is greater than the thickness of the material layer 73. By providing the second blade 28, the amount of the material discharged from the material discharge port 255 is appropriately limited.

Next, the recoater head 25 is moved from the second position to the first position. FIG. 6 illustrates the recoater head 25 during movement from the second position to the first position. At this time, the material leveled by the second blade 28 is further leveled by the first blade 27. In this way, the material layer 73 of the desired thickness is formed.

Figure 7:
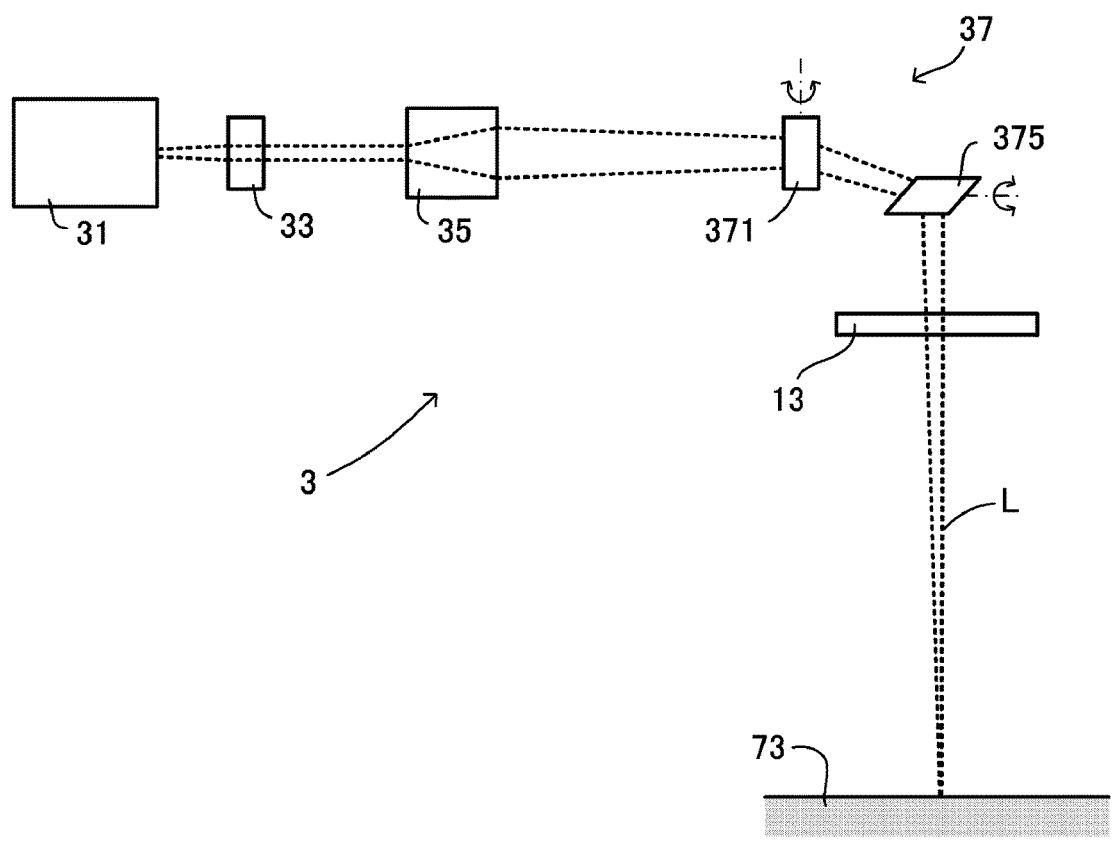
FIG. 7 is a schematic configuration view of an irradiator.

The irradiator 3 is provided above the chamber 11. The irradiator 3 irradiates the material layer 73 with a laser beam L and melts or sinters the material layer 73 to form the solidified layer 75. As illustrated in FIG. 7, the irradiator 3 of the present embodiment includes a beam source 31, a collimator 33, a focus control unit 35, and a scanner 37.

The beam source 31 generates the laser beam L. Here, the type of the laser beam L is not limited if the laser beam L is able to sinter or melt the material layer 73. For example, the laser beam L may be a fiber laser, a $CO_2$ laser, a YAG laser, a green laser or a blue laser. The collimator 33 converts the laser beam L output from the beam source 31 into parallel light. The focus control unit 35 includes a focal adjustment lens 351, a lens actuator 353 that moves the focal adjustment lens 351 back and forth, and a condenser lens fixed in a predetermined position. The laser beam L output from the beam source 31 passes through the focal adjustment lens 351 and the condenser lens, and is adjusted to a desired spot diameter. The scanner 37 is, for example, a galvanometer scanner. The scanner 37 includes an X-axis galvanometer mirror 371, an X-axis actuator 373 that rotates the X-axis galvanometer mirror 371, a Y-axis galvanometer mirror 375, and a Y-axis actuator 377 that rotates the Y-axis galvanometer mirror 375. The X-axis galvanometer mirror 371 and the Y-axis galvanometer mirror 375 have a controlled rotation angle and two-dimensionally scan the laser beam L output from the beam source 31.

The laser beam L that has passed through the X-axis galvanometer mirror 371 and the Y-axis galvanometer mirror 375 is transmitted through a window 13 provided on an upper surface of the chamber 11, and is irradiated onto the material layer 73 formed in the build region R. The window 13 is formed of a material capable of transmitting the laser beam L. For example, in the case where the laser beam L is a fiber laser or a YAG laser, the window 13 may be formed of quartz glass.

A contamination prevention device 15 is provided on the upper surface of the chamber 11 so as to cover the window 13. The contamination prevention device 15 includes a housing having a cylindrical shape and a diffusing member having a cylindrical shape arranged in the housing. An inert gas supplying space is provided between the housing and the diffusing member. An opening part is provided on a bottom surface of the housing inside the diffusing member. A large number of pores are provided in the diffusing member, and a clean inert gas supplied to the inert gas supplying space fills a clean room through the pores. Then, the clean inert gas that fills the clean room is ejected toward below the contamination prevention device 15 through the opening part. In this way, adhesion of fumes to the window 13 is prevented.

The irradiator 3 of the present embodiment is configured to irradiate the laser beam L and form the solidified layer 75. However, the irradiator may also irradiate an electron beam. For example, the irradiator may be configured to have a cathode electrode emitting electrons, an anode electrode converging and accelerating electrons, a solenoid forming a magnetic field and converging directions of an electron beam into one direction, and a collector electrode electrically connected to the material layer 73 as an irradiated body and applying a voltage between itself and the cathode electrode.

The additive manufacturing apparatus 1 may include a cutting device performing cutting on a surface or an unwanted portion of the solidified layer 75. The cutting device includes, for example, a processing head, a processing head driving device that moves the processing head to a desired position in the chamber 11, and a spindle provided on the processing head and gripping and rotating a cutting tool.

Figure 8:
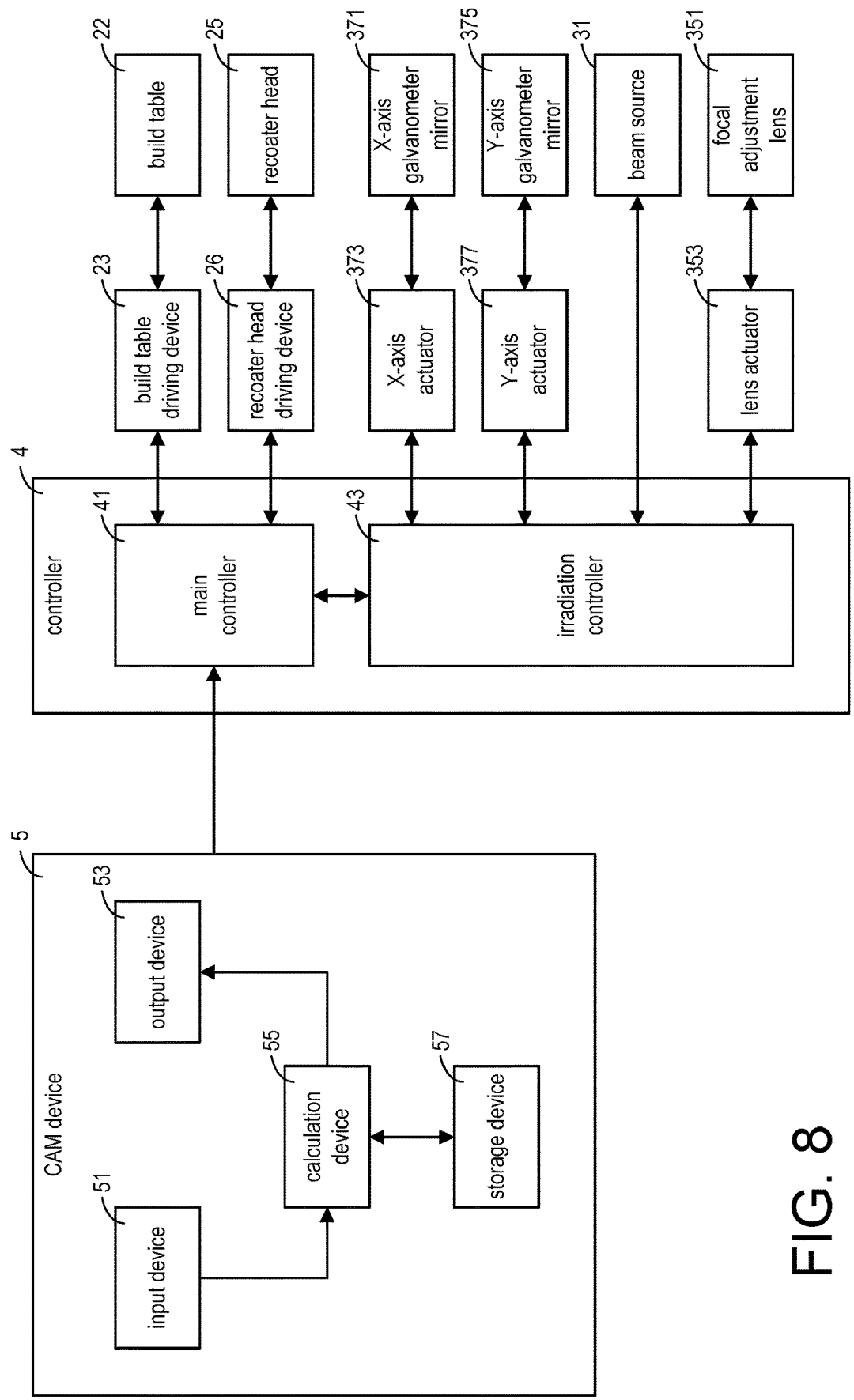
FIG. 8 is a block diagram of a controller and a CAM device.

The controller 4 controls each device of the additive manufacturing apparatus 1 based on the additive manufacturing program prepared by the CAM device 5. As illustrated in FIG. 8, the controller 4 includes a main controller 41 and an irradiation controller 43.

The main controller 41 controls each device in accordance with the additive manufacturing program prepared by the CAM device 5. Specifically, the main controller 41 drives the build table driving device 23 and the recoater head driving device 26 to move the build table 22 and the recoater head 25, thereby forming the material layer 73. More specifically, as described above, at the time of forming one material layer 73, the main controller 41 controls the recoater head 25 to move from the right side of the build region R to the left side of the build region R, and then move from the left side of the build region R to the right side of the build region R. In the case where the additive manufacturing apparatus 1 includes the cutting device, the main controller 41 controls the cutting device to perform cutting on the solidified layer 75. The main controller 41 sends a command in the additive manufacturing program that pertains to the irradiator 3 to the irradiation controller 43.

The irradiation controller 43 controls the irradiator 3 according to the additive manufacturing program sent from the main controller 41. Specifically, the irradiation controller 43 drives the X-axis actuator 373 to control the rotation angle of the X-axis galvanometer mirror 371, and drives the Y-axis actuator 377 to control the rotation angle of the Y-axis galvanometer mirror 375. Accordingly, an irradiation position of the laser beam L is controlled. The irradiation controller 43 controls the beam source 31 to switch an intensity and on/off of the laser beam L. The irradiation controller 43 drives the lens actuator 353 to control a position of the focal adjustment lens 351, and controls the spot diameter of the laser beam L.

The controller 4 is not limited to the above embodiment if it is configured to control each device based on a command of the additive manufacturing program prepared by the CAM device 5. The controller 4 may be composed of any combination of hardware and software.

Next, the CAM device 5 preparing the additive manufacturing program is described. The CAM device 5 is a computer on which computer-aided manufacturing software is installed, and prepares the additive manufacturing program used in the additive manufacturing apparatus 1. As illustrated in FIG. 8, the CAM device 5 includes an input device 51, an output device 53, a calculation device 55, and a storage device 57. The input device 51 is a device for an operator to input information necessary for various processing, and is, for example, a keyboard or a mouse. The output device 53 is a device displaying various information to the operator, and is, for example, a monitor. The calculation device 55 performs various calculations based on a program of the computer-aided manufacturing software, a three-dimensional model 6 pertaining to a three-dimensional object, or the information input by the operator. The calculation device 55 is, for example, a CPU. The storage device 57 stores the three-dimensional model 6 or data necessary for calculation. The storage device 57 is, for example, a RAM, a ROM, an auxiliary storage device, or a combination thereof.

Figure 9:
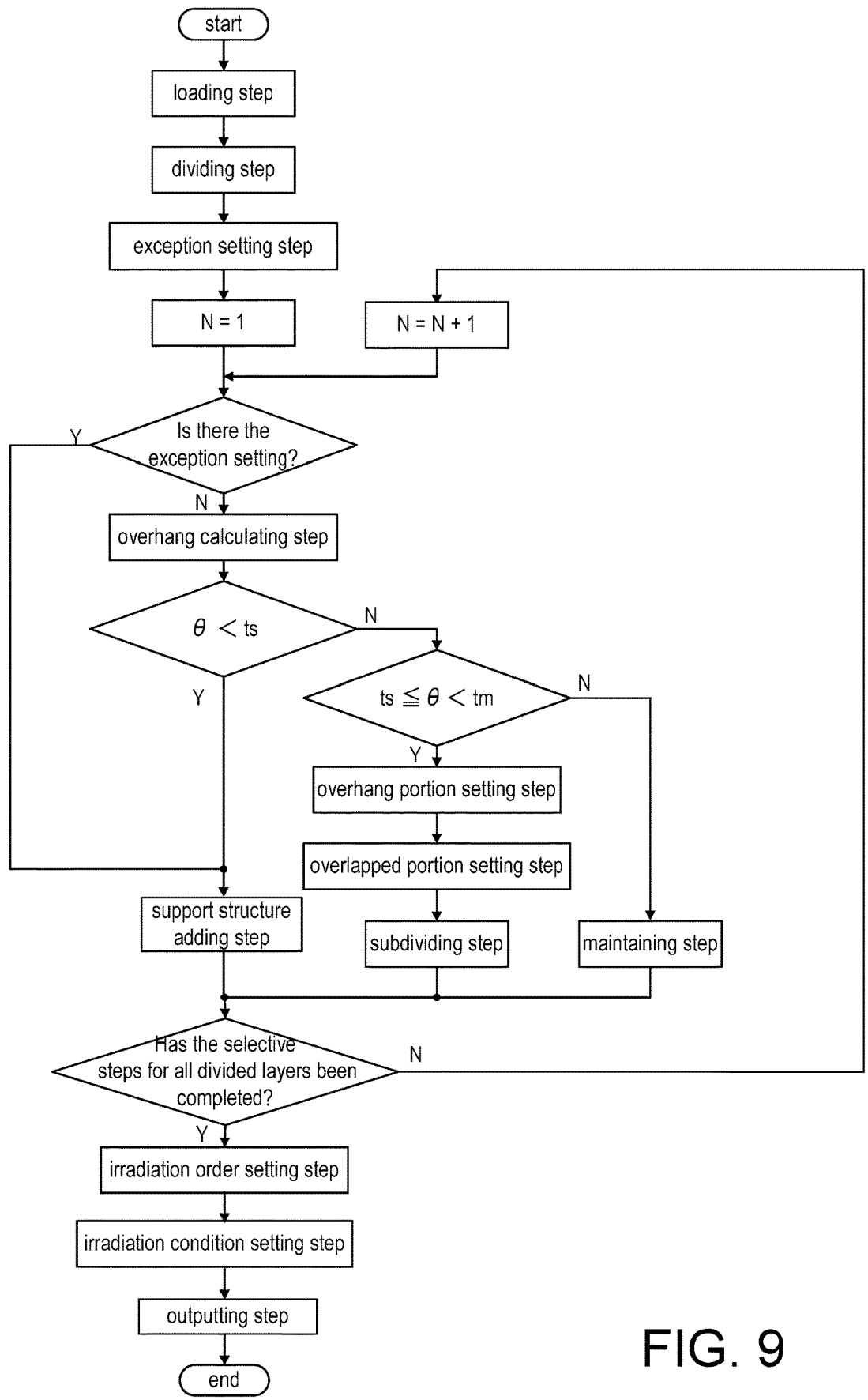
FIG. 9 is a flowchart of a method for preparing an additive manufacturing program.

Here, a method for preparing an additive manufacturing program in the CAM device 5 is described. As illustrated in FIG. 9, the method for preparing an additive manufacturing program of the present embodiment includes a loading step, a dividing step, an exception setting step, an overhang calculating step, a maintaining step, an overhang portion setting step, an overlapped portion setting step, a subdividing step, a support structure adding step, an irradiation order setting step, an irradiation condition setting step, and an outputting step. In the following description, a portion horizontally protruding with respect to a divided layer directly underneath is referred to as an overhang portion 64. An inclination angle of the overhang portion 64 is referred to as an overhang angle θ. A horizontal length of the overhang portion 64 is referred to as an overhang length d.

Figure 10:
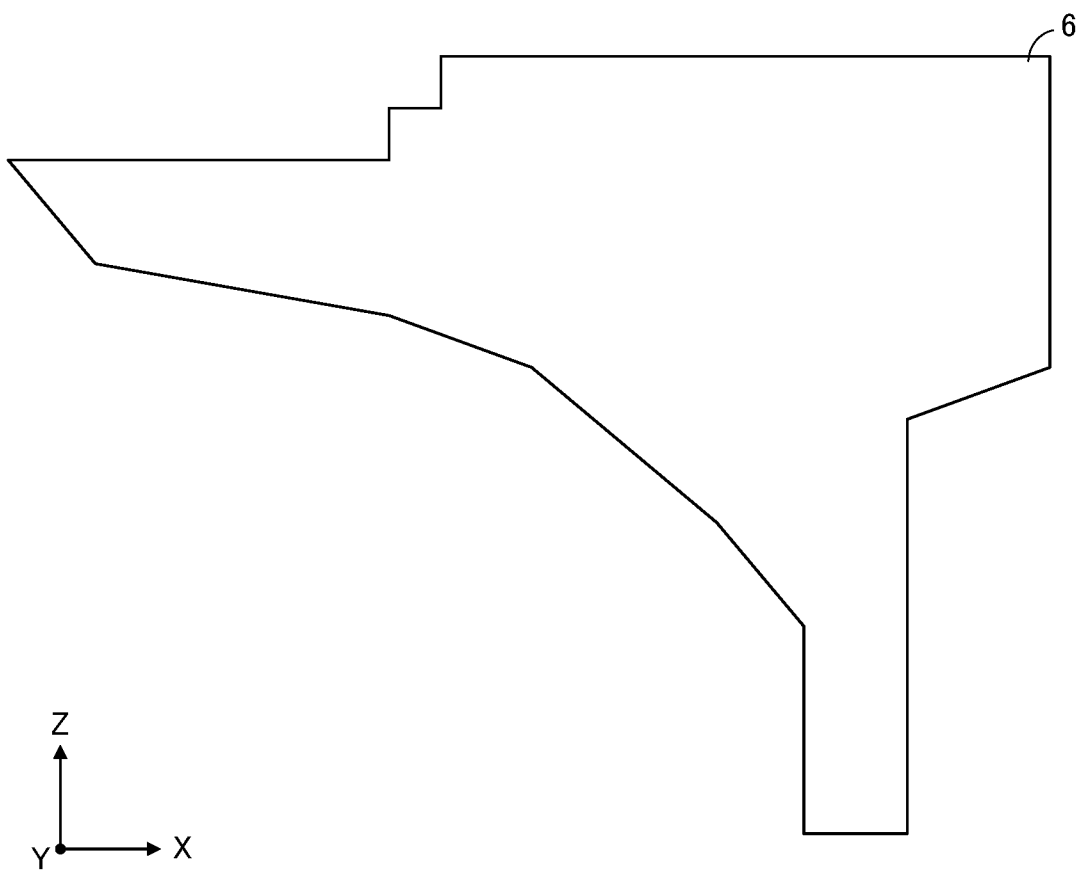
FIG. 10 illustrates an example of a three-dimensional model.

In the loading step, the three-dimensional model 6 pertaining to the desired three-dimensional object that is prepared by a computer-aided design (CAD) device or the like is loaded. The three-dimensional model 6 is design data expressing a three-dimensional shape of the desired three-dimensional object. The loaded three-dimensional model 6 is arranged at an appropriate position and angle on three-dimensional coordinates. Here, a horizontal axis of the three-dimensional coordinates is taken as an X axis, a horizontal axis orthogonal to the X axis is taken as a Y axis, and a vertical axis is taken as a Z axis. A direction of the Z axis coincides with a lamination direction being a direction in which the solidified layer 75 is laminated. FIG. 10 illustrates an example of the three-dimensional model 6. Here, to simplify the description, the three-dimensional model 6 in which the overhang portion 64 protrudes only in the X-axis direction is described as an example. However, it is also possible to prepare an additive manufacturing program by the same procedure for a three-dimensional model including the overhang portion 64 protruding in the Y-axis direction.

Figure 11:
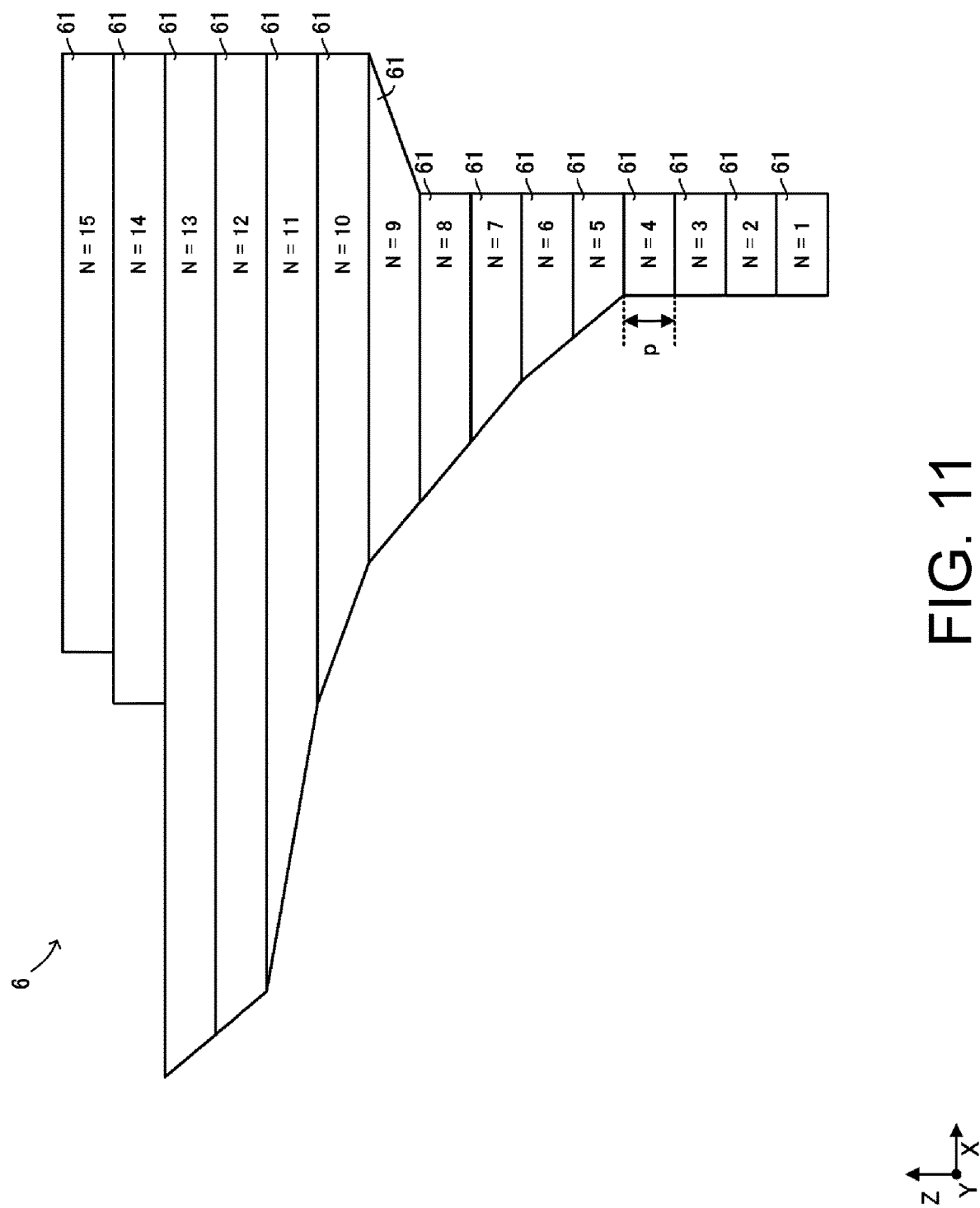
FIG. 11 illustrates the three-dimensional model after a dividing step.

In the dividing step, the three-dimensional model 6 is divided into a plurality of divided layers at a lamination pitch of a predetermined size in the lamination direction. That is, the divided layers are so-called slice data of the three-dimensional model 6. In the following, the lamination pitch in the dividing step is particularly referred to as a normal lamination pitch p, and the divided layer obtained by division at intervals of the normal lamination pitch p is particularly referred to as a normal divided layer 61. FIG. 11 illustrates an example of the three-dimensional model 6 after the dividing step. Each of the normal divided layer 61 is numbered in order from the bottom. N in the figure indicates the number of the normal divided layer 61.

In the exception setting step, the operator optionally sets the normal divided layer 61 for performing the later-described support structure adding step regardless of the overhang angle θ or the overhang length d. A support structure 66 may be added for purposes other than supporting the overhang portion 64. For example, the support structure 66 may be added in order to suppress strain due to the influence of residual stress generated in the solidified layer 75 during manufacturing. The support structure 66 may be added in order to release the heat generated in the material layer 73 and the solidified layer 75 during manufacturing to the build table 22, or alternatively, to transmit the heat of the heated build table 22 to the material layer 73 and the solidified layer 75. By performing the exception setting step, the support structure 66 can be added as necessary to the normal divided layer 61 that does not require the support structure 66 from the viewpoint of supporting the overhang portion 64. In the three-dimensional model 6 of the present embodiment, exception setting is performed on the twelfth and thirteenth normal divided layers 61.

After the exception setting step, the overhang calculating step, and one of the maintaining step, the subdividing step and the support structure adding step are performed in order from, for example, the first normal divided layer 61. However, with respect to the normal divided layer 61 on which the exception setting has been performed in the exception setting step, the overhang calculating step may be skipped and the support structure adding step may be directly performed.

In the overhang calculating step, the overhang angle θ is calculated with respect to each of the normal divided layer 61. An end face of the normal divided layer 61 may include a curved surface portion or may be inclined in multiple steps. Hence, an upper surface end and a lower surface end of the normal divided layer 61 of which the overhang angle θ is to be calculated may be interpolated by a straight line, and the overhang angle θ may be calculated. In the present embodiment, the overhang angle θ is calculated by a formula of $\theta = \tan^{-1}(p/d)$ from the size of the overhang length d and the size of the normal lamination pitch p. When the overhang angle θ of a predetermined normal divided layer 61 is less than 90°, said normal divided layer 61 has the overhang portion 64. The calculation of the overhang angle θ is performed in each of the X-axis direction and the Y-axis direction.

Based on the overhang angle θ calculated in the overhang calculating step, one of the maintaining step, the subdividing step and the support structure adding step is selectively performed. Specifically, the maintaining step is performed with respect to the normal divided layer 61 in which the overhang angle θ is equal to or greater than a first angle threshold tm. The subdividing step is performed with respect to the normal divided layer 61 in which the overhang angle θ is less than the first angle threshold tm and equal to or greater than a second angle threshold ts. The support structure adding step is performed with respect to the normal divided layer 61 in which the overhang angle θ is less than the second angle threshold ts. Here, the first angle threshold tm is any value equal to or less than 90°, and the second angle threshold ts is less than the first angle threshold tm. In the three-dimensional model 6 of the present embodiment, the maintaining step is performed with respect to the first to sixth, fourteenth and fifteenth normal divided layers 61. The subdividing step is performed with respect to the seventh to tenth normal divided layers 61. The support structure adding step is performed with respect to the eleventh normal divided layer 61.

The first angle threshold tm is a threshold of an angle assumed that manufacturing can be performed while the normal divided layer 61 remains as it is. The second angle threshold ts is a threshold of an angle at which addition of the support structure 66 may be considered necessary. The operator may be able to input any value for the first angle threshold tm and the second angle threshold ts. The first angle threshold tm is, for example, 45°. The second angle threshold ts is, for example, 15°.

In the maintaining step, neither subdivision of the normal divided layer 61 nor addition of the support structure 66 supporting the normal divided layer 61 is performed. That is, a state of the normal divided layer 61 generated by the dividing step is maintained. Even in the normal divided layer 61 having the overhang portion 64, if the overhang angle θ is large, that is, if the inclination is gentle, manufacturing can be performed with the normal lamination pitch p as it is.

Figure 12:
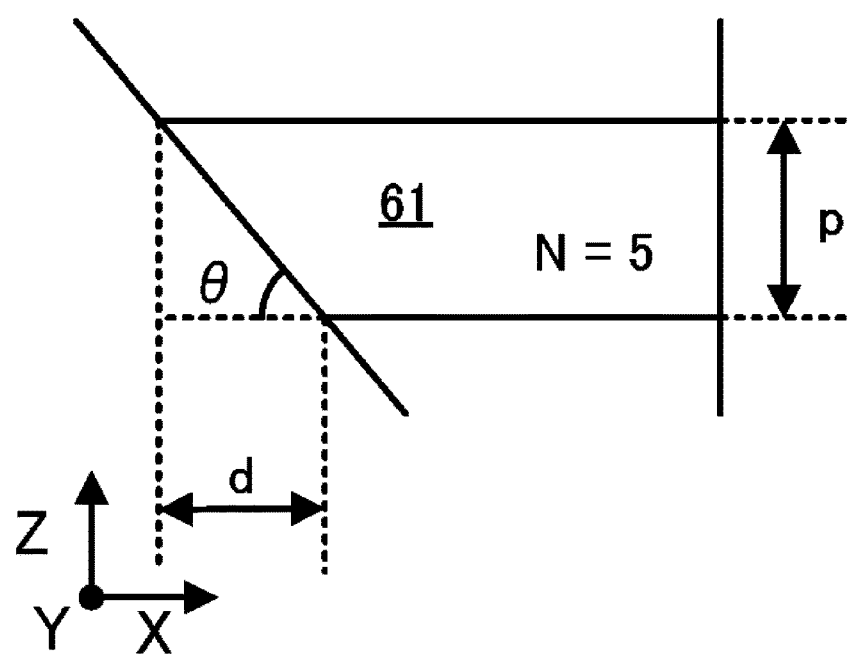
FIG. 12 is an enlarged view of the fifth divided layer.

FIG. 12 illustrates the fifth normal divided layer 61 in which the maintaining step is performed. When the overhang portion 64 is not present in the normal divided layer 61, since the overhang angle θ becomes 90° or more, the maintaining step is selected unless the exception setting has been performed.

In the present embodiment, before the subdividing step is performed, the overhang portion setting step and the overlapped portion setting step are performed, and only the overhang portion 64 and an overlapped portion 65 are to be subdivided. However, in the subdividing step, in the normal divided layer 61 as a target, it is sufficient to subdivide at least a part including the overhang portion 64 in the lamination direction. For example, the entire normal divided layer 61 as the target may be subdivided in the lamination direction. In this case, the overhang portion setting step and the overlapped portion setting step may not be performed. However, it is advantageous to subdivide only a part from the viewpoint of shortening the manufacturing time.

Figure 13:
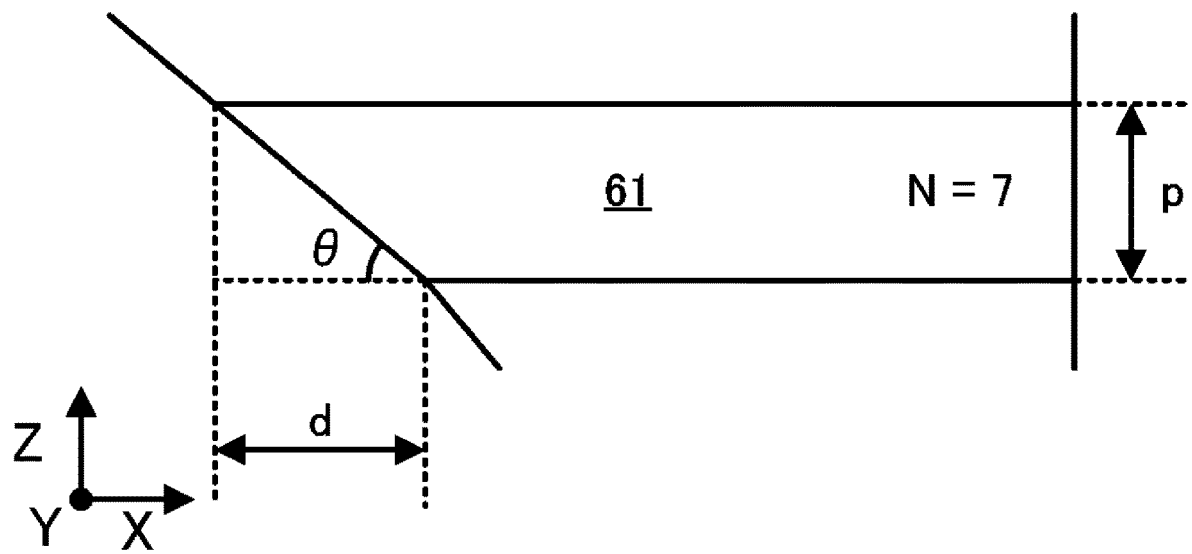
FIG. 13 is an enlarged view of the seventh divided layer.
Figure 14:
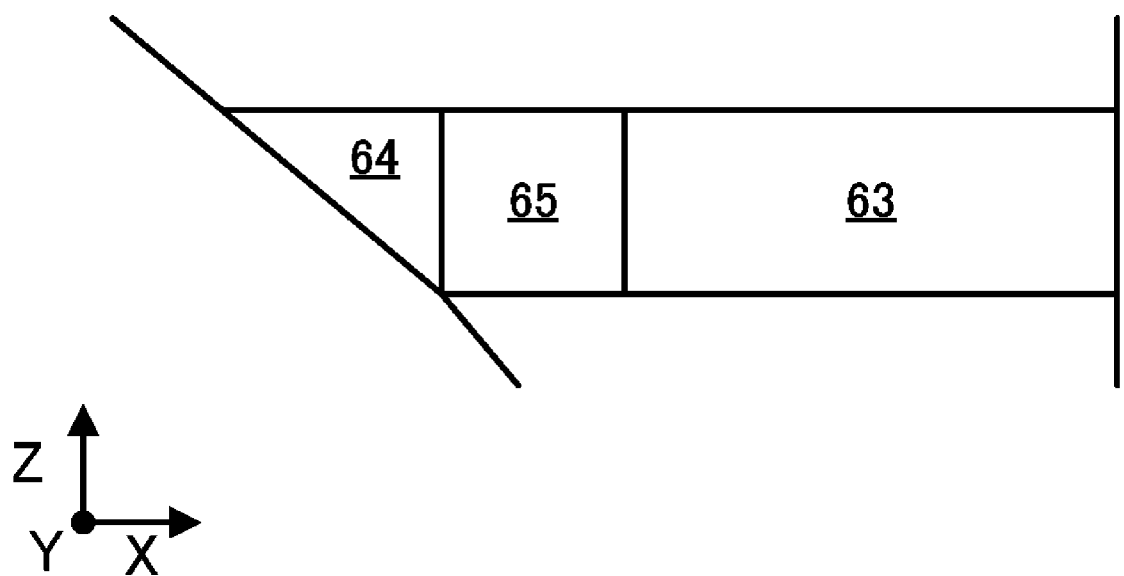
FIG. 14 is an enlarged view of the seventh divided layer after an overhang portion setting step and an overlapped portion setting step.
Figure 15:
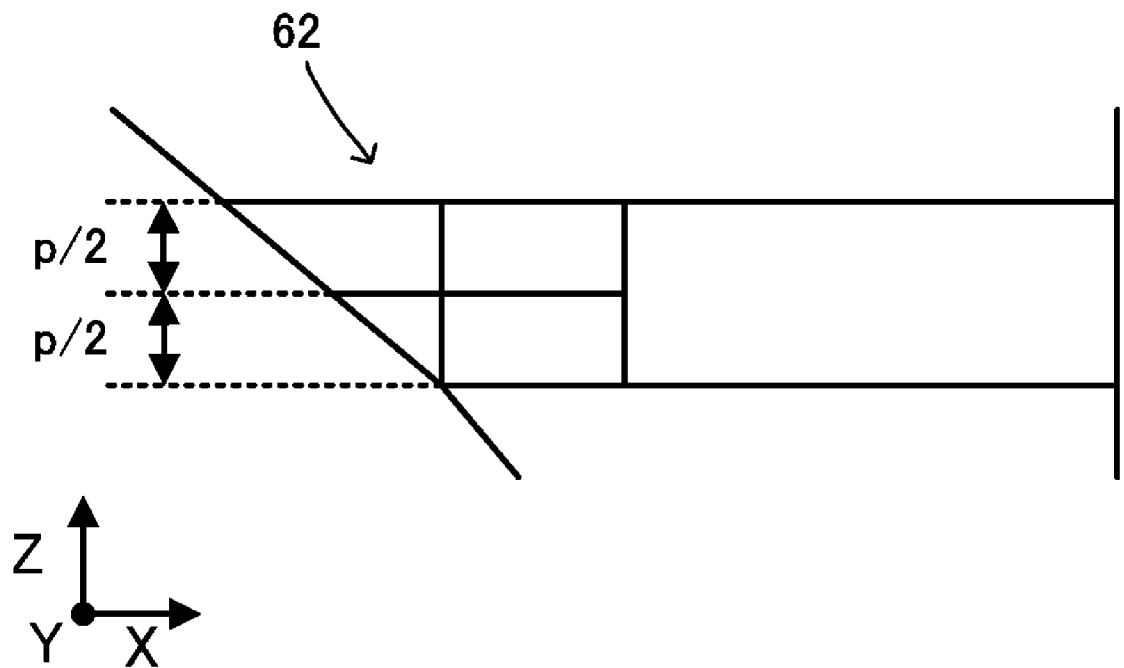
FIG. 15 is an enlarged view of the seventh divided layer after a subdividing step.

Here, the overhang portion setting step, the overlapped portion setting step and the subdividing step are described by taking the seventh normal divided layer 61 illustrated in FIG. 13 as an example. As illustrated in FIG. 14, first, in the overhang portion setting step, a region of the overhang portion 64 is set with respect to the normal divided layer 61 as the target of the subdividing step. That is, a portion protruding in the X-axis direction and a portion protruding in the Y-axis direction are each set as the overhang portion 64. Next, the overlapped portion 65 being a region of a predetermined width is set in a position adjacent to the overhang portion 64. The width of the overlapped portion 65 may be optionally set, and is, for example, 0.1 mm or more and 10 mm or less. In the following, in the normal divided layer 61, a region other than the overlapped portion 65 and the overhang portion 64 is referred to as a normal portion 63. Then, in the subdividing step, the overhang portion 64 and the overlapped portion 65 are subdivided into two or more in the lamination direction. Specifically, in the seventh normal divided layer 61, the overhang portion 64 and the overlapped portion 65 are subdivided at a subdivision lamination pitch p/2 obtained by dividing the normal lamination pitch p by 2. In the following, a divided layer in which the subdividing step is performed is particularly referred to as a subdivided divided layer 62. In this way, as illustrated in FIG. 15, the subdivided divided layer 62 is obtained in which at least a part of the normal divided layer 61 is further divided.

A value of the normal lamination pitch p depends on specifications of the irradiator 3, and is generally about 20 μm to about 150 μm. The subdivision lamination pitch may have any value smaller than the normal lamination pitch p, and a lower limit thereof is determined by an average particle diameter of the material. Considering that the layer thickness is slightly reduced when the material layer 73 is melted or sintered to form the solidified layer 75, theoretically, the lower limit of the subdivision lamination pitch is smaller than the average particle diameter of the material. For example, in the case of using a material having an average particle diameter of about 35 μm, the lower limit of the subdivision lamination pitch may be set as about 10 μm.

At the time of subdividing at least a part of the normal divided layer 61, it is not essential to make the thickness of each even. However, from the viewpoint of simplifying calculation and control, division into two or more equal parts at a subdivision lamination pitch p/m obtained by dividing the normal lamination pitch p by an integer m of 2 or more is desired.

The number of divisions of the divided layer in the subdividing step may be configured to differ depending on the size of the overhang angle θ or the overhang length d. That is, the size of the subdivision lamination pitch may be changed according to the size of the overhang angle θ or the overhang length d. In the present embodiment, the operator sets a suitable subdivision lamination pitch for each value of the overhang angle θ. For example, if the overhang angle θ is 30° or more and less than 45°, the subdivision lamination pitch is set as p/2; if the overhang angle θ is 15° or more and less than 30°, the subdivision lamination pitch is set as p/3. Alternatively, the operator may set a suitable subdivision lamination pitch for each value of the overhang length d. Alternatively, a permissible value may be set in advance as the overhang length d of the subdivided divided layer 62, and the subdivision lamination pitch may be automatically calculated so that the overhang length d of the subdivided divided layer 62 is less than a specified value. The subdivision lamination pitch may be determined with reference to a database of appropriate subdivision lamination pitches corresponding to the overhang angle θ or the overhang length d pre-stored in the CAM device 5.

In the case where a plurality of overhang portions 64 are present in the normal divided layer 61 and the overhang angle θ pertaining to each overhang portion 64 is different, the smallest overhang angle θ may be regarded as the overhang angle θ of the normal divided layer 61. Specifically, in any case where two or more overhang portions 64 are present protruding in the X-axis direction, or where two or more overhang portions 64 are present protruding in the Y-axis direction, or where one or more overhang portions 64 are present protruding in the X-axis direction and one or more overhang portions 64 are present protruding in the Y-axis direction, the smallest overhang angle θ may be regarded as the overhang angle θ of the normal divided layer 61.

Figure 16:
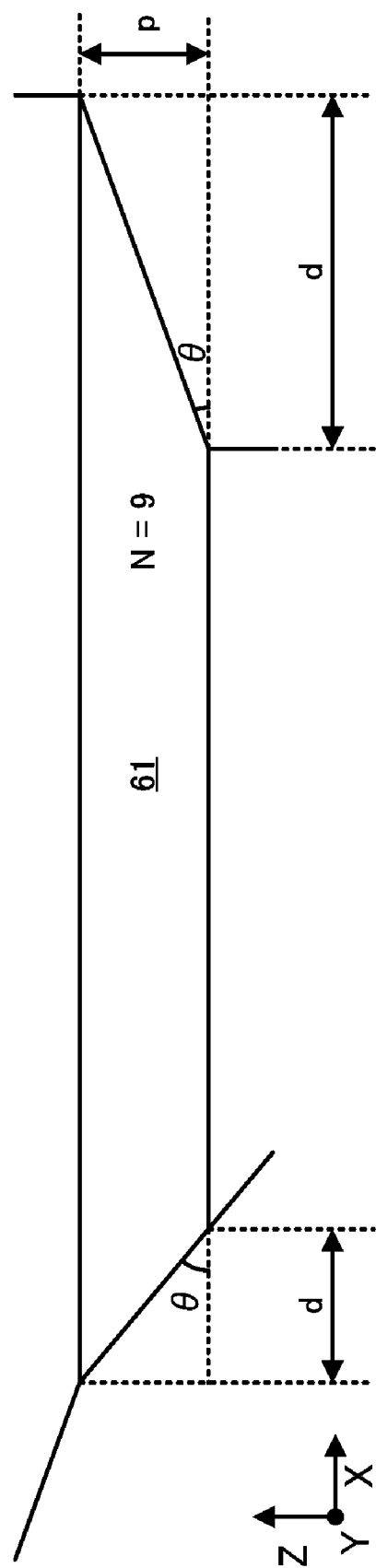
FIG. 16 is an enlarged view of the ninth divided layer.
Figure 17:
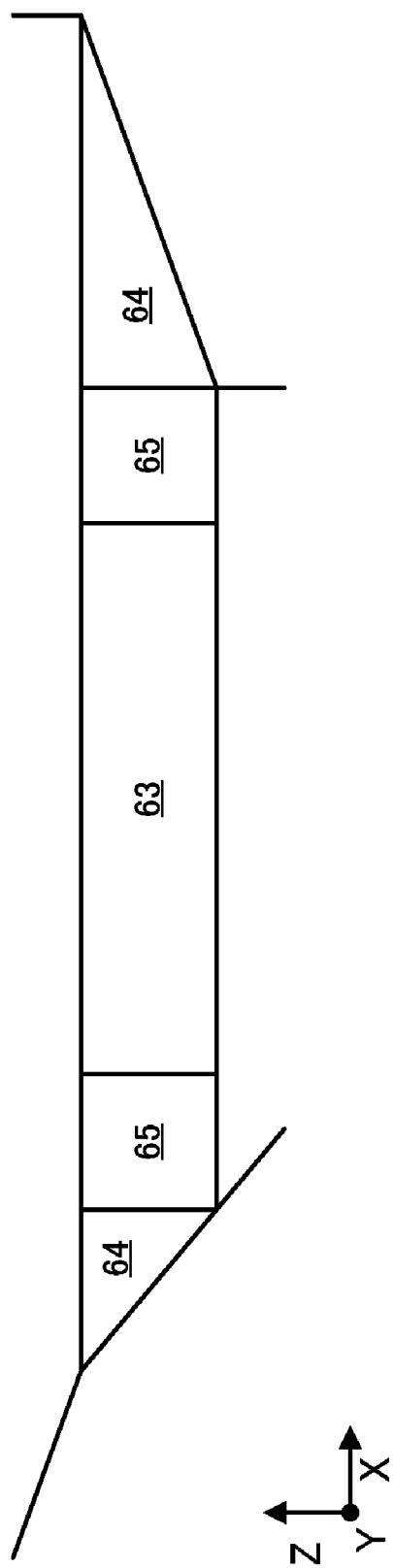
FIG. 17 is an enlarged view of the ninth divided layer after the overhang portion setting step and the overlapped portion setting step.
Figure 18:
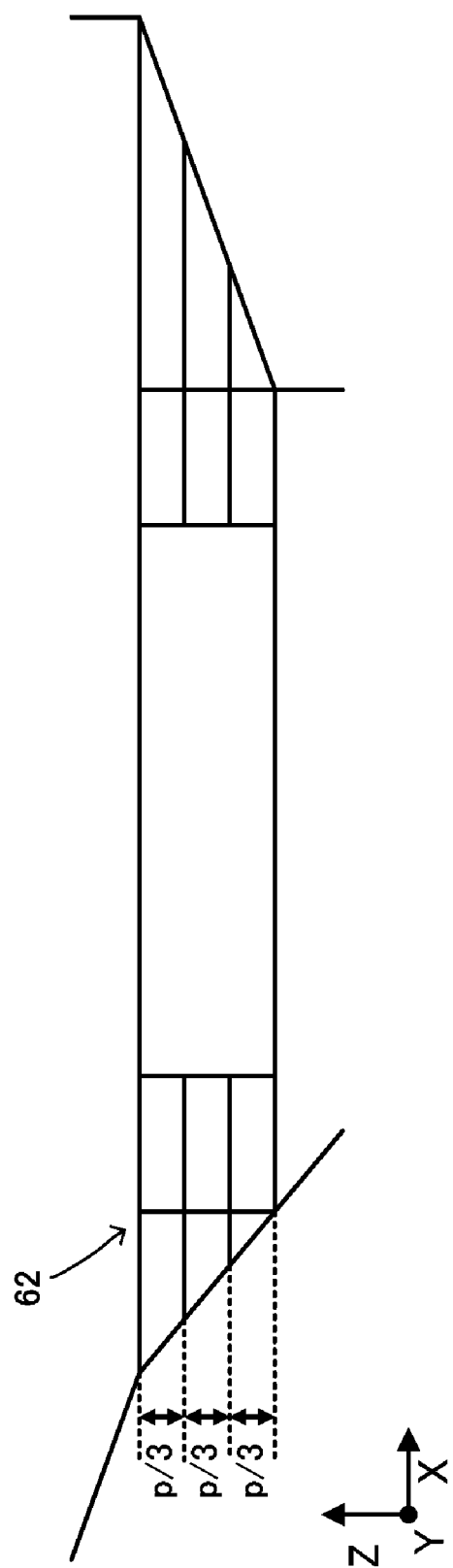
FIG. 18 is an enlarged view of the ninth divided layer after the subdividing step.

FIG. 16 to FIG. 18 illustrate the overhang portion setting step, the overlapped portion setting step and the subdividing step pertaining to the ninth normal divided layer 61. The ninth normal divided layer 61 has two overhang portions 64, each of which has a different overhang angle θ. In the ninth normal divided layer 61, based on the smaller overhang angle θ of the two overhang angles θ, the overhang portion 64 and the overlapped portion 65 are subdivided into three at a subdivision lamination pitch p/3 obtained by dividing the normal lamination pitch p by 3.

In the support structure adding step, no subdivision is performed on the normal divided layer 61, and the support structure 66 supporting the normal divided layer 61 is added to the three-dimensional model 6. When the overhang angle θ is small, that is, when the inclination is steep, if the overhang length d is reduced to such an extent that manufacturing can be performed without the support structure 66 by subdivision, the subdivision lamination pitch may become very small. If the subdivision lamination pitch is excessively small, there is a risk that manufacturing may become difficult or excessively much manufacturing time may be spent. Accordingly, in the present embodiment, the support structure 66 is added to correspond to the normal divided layer 61 having a small overhang angle θ. As described above, the support structure 66 is also added to the normal divided layer 61 in which the exception setting has been performed in the exception setting step. The support structure 66 may be in any shape as long as it is capable of supporting the normal divided layer 61. For example, the support structure 66 may have a simple columnar shape or a shape having voids, such as a lattice shape. The support structure 66 is divided by the normal lamination pitch p in the lamination direction.

Figure 19:
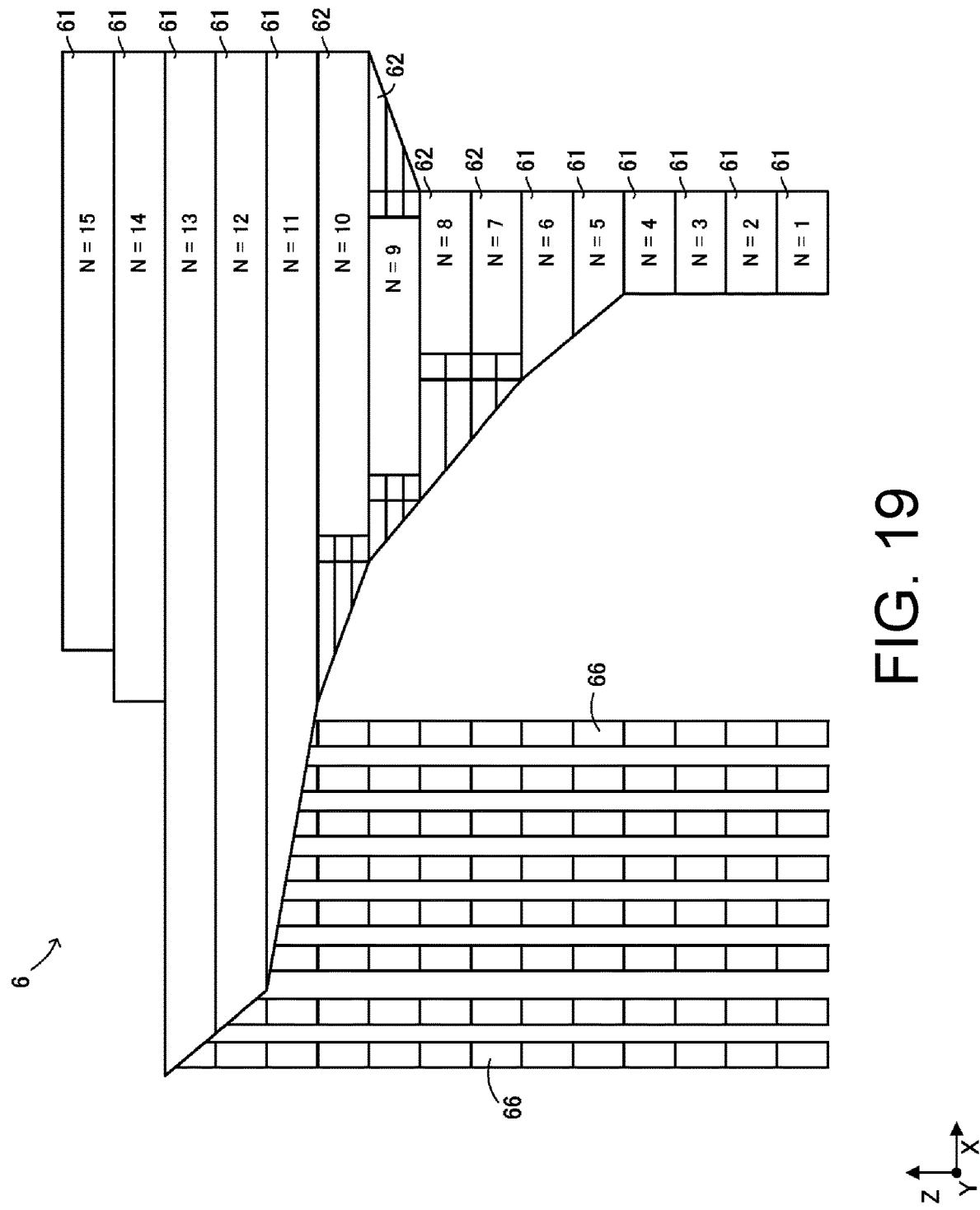
FIG. 19 illustrates the three-dimensional model after a maintaining step, the subdividing step, or a support structure adding step.

The above steps are repeated, and one of the maintaining step, the subdividing step, and the support structure adding step is selectively performed with respect to all the normal divided layers 61. That is, a selective step is performed with respect to all the divided layers. In this way, the three-dimensional model 6 as illustrated in FIG. 19 is obtained. Here, the irradiation order setting step and the irradiation condition setting step are performed with respect to the divided layer in which the maintaining step, the subdividing step or the support structure adding step has been performed.

In the irradiation order setting step, an irradiation order of each divided layer is set. For example, the irradiation order is set in order from the bottom, such as in an order of the first divided layer and the support structure 66 at the same height, the second divided layer and the support structure 66 at the same height, and so on. With respect to the divided layer in which the subdividing step has been performed, that is, the overhang portion 64 and the overlapped portion 65 located at the same height in the subdivided divided layer 62, the irradiation order is set so that the overlapped portion 65 is irradiated with the laser beam L or the electron beam earlier than the overhang portion 64.

Figure 20:
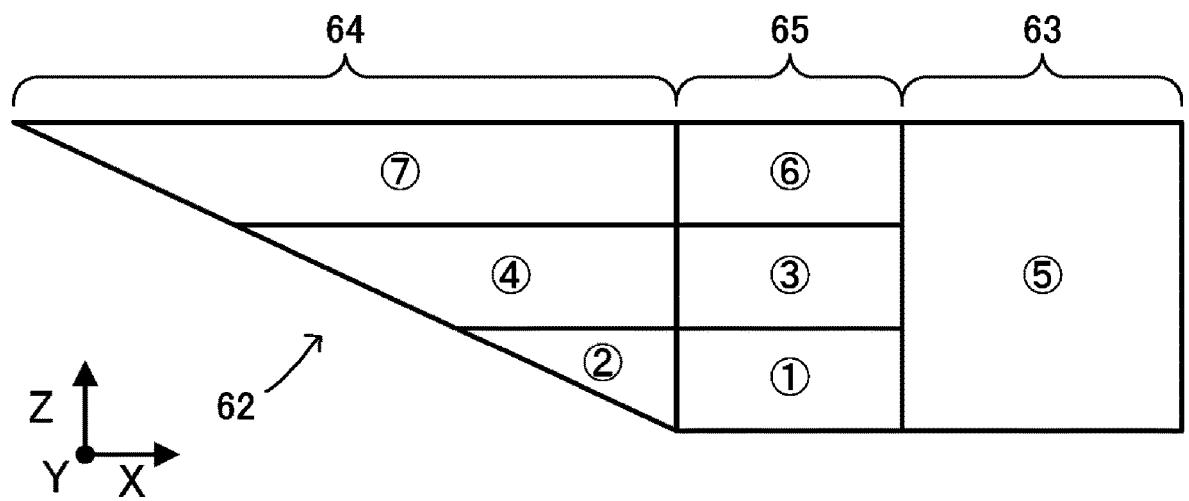
FIG. 20 is an explanatory view of an irradiation order setting step.

Here, the subdivided divided layer 62 illustrated in FIG. 20 is described as an example. Circled numbers in the figure indicate the irradiation order. Hereinafter, in the case where the overhang portion 64 and the overlapped portion 65 have been divided into m pieces, the lowermost overhang portion 64 and the lowermost overlapped portion 65 are taken as the first overhang portion 64 and the first overlapped portion 65, and the uppermost overhang portion 64 and the uppermost overlapped portion 65 are taken as the m-th overhang portion 64 and the m-th overlapped portion 65. First, an irradiation order is set as follows: the first overlapped portion 65, and then the first overhang portion 64. With respect to the second and subsequent overhang portions 64 and overlapped portions 65, the irradiation order is similarly set as follows: the overlapped portion 65, and then the overhang portion 64. After the (m−1)-th overhang portion 64, the irradiation order is set as follows: the normal portion 63, then the m-th overlapped portion 65, and then the m-th overhang portion 64. However, the normal portion 63 may be after the m-th overlapped portion 65 or the m-th overhang portion 64 in the irradiation order. If the support structure 66 at the same height as the subdivided divided layer 62 is present, the irradiation order of the support structure 66 may be set from the (m−1)-th overhang portion 64. In this way, the irradiation order in the subdivided divided layer 62 is set.

At least a part of the solidified layer 75 pertaining to the overhang portion 64 is manufactured into a portion without the solidified layer 75 present directly underneath. In contrast, the solidified layer 75 pertaining to the overlapped portion 65 is formed on another solidified layer 75, and therefore enables relatively stable manufacturing. By manufacturing in the order of the overlapped portion 65 and overhang portion 64 at the same height, since the solidified layer 75 pertaining to the overhang portion 64 is fixed to a side surface of the solidified layer 75 pertaining to the overlapped portion 65, relatively stable manufacturing can be performed.

In the irradiation condition setting step, an irradiation condition of the laser beam L or the electron beam in each divided layer is set based on the information input by the operator, or pre-stored data. The same irradiation condition as a conventional one may be set with respect to the normal divided layer 61 and the normal portion 63.

The material layer 73 and the solidified layer 75 pertaining to the overhang portion 64 and the overlapped portion 65 have a relatively small thickness. Accordingly, with respect to the overhang portion 64 and the overlapped portion 65, it is desirable that an irradiation condition be set in which an energy density is lower than that in an irradiation condition with respect to the normal divided layer 61 and the normal portion 63. Here, the energy density is determined by the following formula: energy density $[J/mm^2]$=intensity $[W]$/(spot diameter $[mm]$×irradiation speed $[mm/s]$). That is, the energy density can be lowered by lowering the intensity, increasing the spot diameter, or increasing the irradiation speed. For example, when the number of divisions of the overhang portion 64 and the overlapped portion 65 in a predetermined subdivided divided layer 62 is m, an irradiation condition obtained by dividing the intensity in the irradiation condition with respect to the normal divided layer 61 and the normal portion 63 by m may be set as the irradiation condition for the overhang portion 64 and the overlapped portion 65.

Since the support structure 66 is to be removed in the end, it requires relatively low dimensional accuracy. With respect to the support structure 66 added for supporting the overhang portion 64, the intensity required for the support structure 66 itself is relatively low. Accordingly, with respect to the support structure 66 for support purposes, an irradiation condition is desirably set in which the ease of removal of the support structure 66 and the manufacturing speed are emphasized. For example, with respect to the support structure 66 for support purposes, an irradiation condition in which the intensity is increased, the spot diameter is increased, and the irradiation speed is increased may be applied in a range in which a predetermined energy density is obtained. On the other hand, with respect to the support structure 66 added for suppressing the strain due to the residual stress of the solidified layer 75, a certain degree of intensity is required. Hence, with respect to the support structure 66 for which a certain degree of intensity is required, such as for strain suppressing purposes, an irradiation condition equivalent to the irradiation condition with respect to the normal divided layer 61 and the normal portion 63 may be set.

Finally, the outputting step is performed in which an additive manufacturing program is output in which a command pertaining to additive manufacturing is defined based on information such as the lamination pitch, the shape, the irradiation order, and the irradiation condition of each divided layer. The additive manufacturing program includes an operation command for the material layer former 2 and the irradiator 3. If the additive manufacturing apparatus 1 includes the cutting device, the additive manufacturing program may include an operation command for the cutting device, such as a cutting path. The additive manufacturing program output from the CAM device 5 is sent to the controller 4 of the additive manufacturing apparatus 1, for example, via a portable storage medium or by wire or wireless communication.

The method for preparing an additive manufacturing program described above is an example, and the disclosure is not limited thereto. Some steps may be modified, omitted or added without departing from the technical idea of the disclosure. The order of each step may be changed, or some steps may be performed in parallel. At least a part of each step may be performed by the controller 4 of the additive manufacturing apparatus 1 instead of by the CAM device 5.

For example, in the present embodiment, whether subdivision is required and whether the support structure 66 is required are determined based on the overhang angle θ. However, the determination may be performed based on the overhang length d. In the present modification, in the overhang calculating step, there is no need to calculate the overhang angle θ and it is sufficient to only calculate the overhang length d. Then, the maintaining step is performed with respect to the normal divided layer 61 in which the overhang length d is less than a first length threshold um. The subdividing step is performed with respect to the normal divided layer 61 in which the overhang length d is equal to or greater than the first length threshold um and less than a second length threshold us. The support structure adding step is performed with respect to the normal divided layer 61 in which the overhang length d is equal to or greater than the second length threshold us. Here, the first length threshold um is any value exceeding 0 μm, and the second length threshold us is greater than the first length threshold urn.

Figure 21:
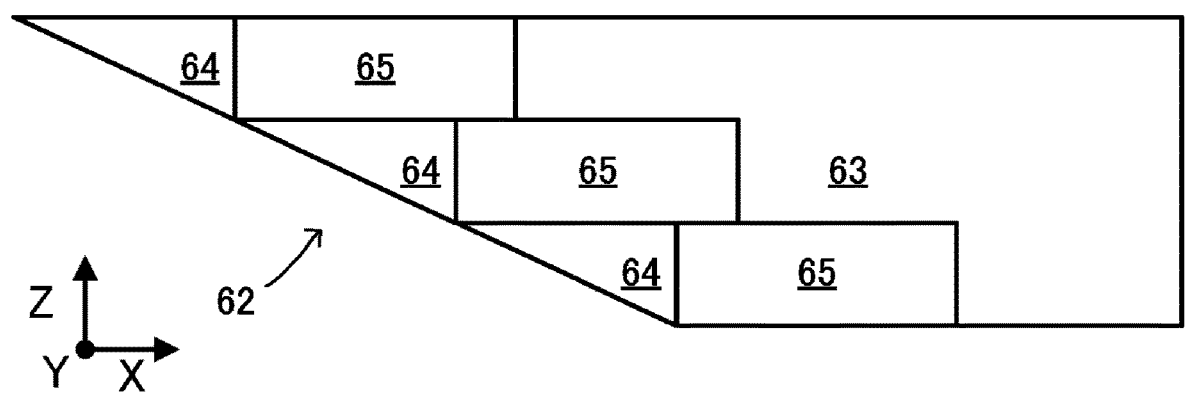
FIG. 21 is an explanatory view of a state after the subdividing step, the overhang portion setting step, and the overlapped portion setting step according to a modification.

In the present embodiment, when the subdividing step is performed, the overhang portion setting step and the overlapped portion setting step have been performed beforehand. However, the overhang portion setting step and the overlapped portion setting step may be performed after the subdividing step. In the present modification, first, the subdividing step is performed with respect to the normal divided layer 61, and the entire normal divided layer 61 is divided at the subdivision lamination pitch. Next, with respect to each layer obtained by division at the subdivision lamination pitch, the overhang portion setting step and the overlapped portion setting step are performed, and the overhang portion 64 and the overlapped portion 65 are set. The remainder not set as the overhang portion 64 and the overlapped portion 65 is treated as the normal portion 63. FIG. 21 illustrates the subdivided divided layer 62 in which the subdividing step, the overhang portion setting step and the overlapped portion setting step are performed by the above procedure. In the subdivided divided layer 62 of the present modification, the lamination pitch of the normal portion 63 differs depending on the position. Hence, in the irradiation condition setting step, it is desirable that the irradiation condition be changed for each position of the normal portion 63. According to the present modification, since the size of the overhang portion 64 can be reduced, the manufacturing speed can be increased.

According to the method for preparing an additive manufacturing program described above, since the normal divided layer 61 is determined in which manufacturing can be performed without the support structure 66 by subdivision according to the overhang angle θ or the overhang length d and the subdividing step is performed only in the aforementioned normal divided layer 61, the support structure 66 can be reduced without excessively increasing the manufacturing time. An improvement in surface smoothness of the solidified layer 75 pertaining to the subdivided divided layer 62 can also be expected.

In accordance with the additive manufacturing program prepared by the above procedure, additive manufacturing is performed in the additive manufacturing apparatus 1. By the controller 4, a correction may be made to the additive manufacturing program according to correction data pertaining to a laser coordinate system or a cutting coordinate system, or according to a state of the additive manufacturing apparatus 1 or the surrounding environment. In a method for additive manufacturing of the present embodiment, the material layer forming step in which the material layer 73 made of a powder material is formed on the build region R and the solidified layer forming step in which the material layer 73 is irradiated with the laser beam L or the electron beam to form the solidified layer 75 are alternately repeated.

The base plate 71 is placed on the build table 22, and the chamber 11 is filled with the inert gas having a predetermined concentration. Then, the material layer forming step and the solidified layer forming step are performed in order from the lower divided layer.

An operation in the case of forming the solidified layer 75 pertaining to the normal divided layer 61 is described. First, the build table 22 is lowered as much as the normal lamination pitch p. However, when the first material layer 73 and the first solidified layer 75 are formed, the build table 22 is positioned so that a distance between the base plate 71 and the lower end of the first blade 27 is the same as the normal lamination pitch p. Next, the recoater head 25 reciprocates on the build region R and levels the material to form the material layer 73 of the desired thickness. Then, the irradiator 3 irradiates the material layer 73 with the laser beam L or the electron beam to form the solidified layer 75 pertaining to the normal divided layer 61. Here, if the support structure 66 is present at the same height, manufacturing of the support structure 66 is also performed.

An operation in the case of forming the solidified layer 75 pertaining to the subdivided divided layer 62 is described. In the following, the number of divisions of the overhang portion 64 and the overlapped portion 65 is described as m. First, the build table 22 is lowered as much as the subdivision lamination pitch p/m. However, when the first material layer 73 and the first solidified layer 75 are formed, the build table 22 is positioned so that the distance between the base plate 71 and the lower end of the first blade 27 is the same as the subdivision lamination pitch p/m. Next, the recoater head 25 reciprocates on the build region R and levels the material to form the material layer 73 of the desired thickness. Then, in accordance with the irradiation order determined by the irradiation order setting step, the irradiator 3 irradiates the material layer 73 with the laser beam L or the electron beam to form the solidified layer 75 pertaining to the first overlapped portion 65 and the first overhang portion 64. The above procedure is repeated, and the solidified layers 75 pertaining to up to the (m−1)-th overlapped portion 65 and the (m−1)-th overhang portion 64 are formed. Then, the build table 22 is lowered as much as the subdivision lamination pitch p/m. In accordance with the irradiation order determined by the irradiation order setting step, the solidified layer 75 pertaining to the normal portion 63, the m-th overlapped portion 65 and the m-th overhang portion 64 is formed. Here, if the support structure 66 is present at the same height, manufacturing of the support structure 66 is also performed.

Figure 22:
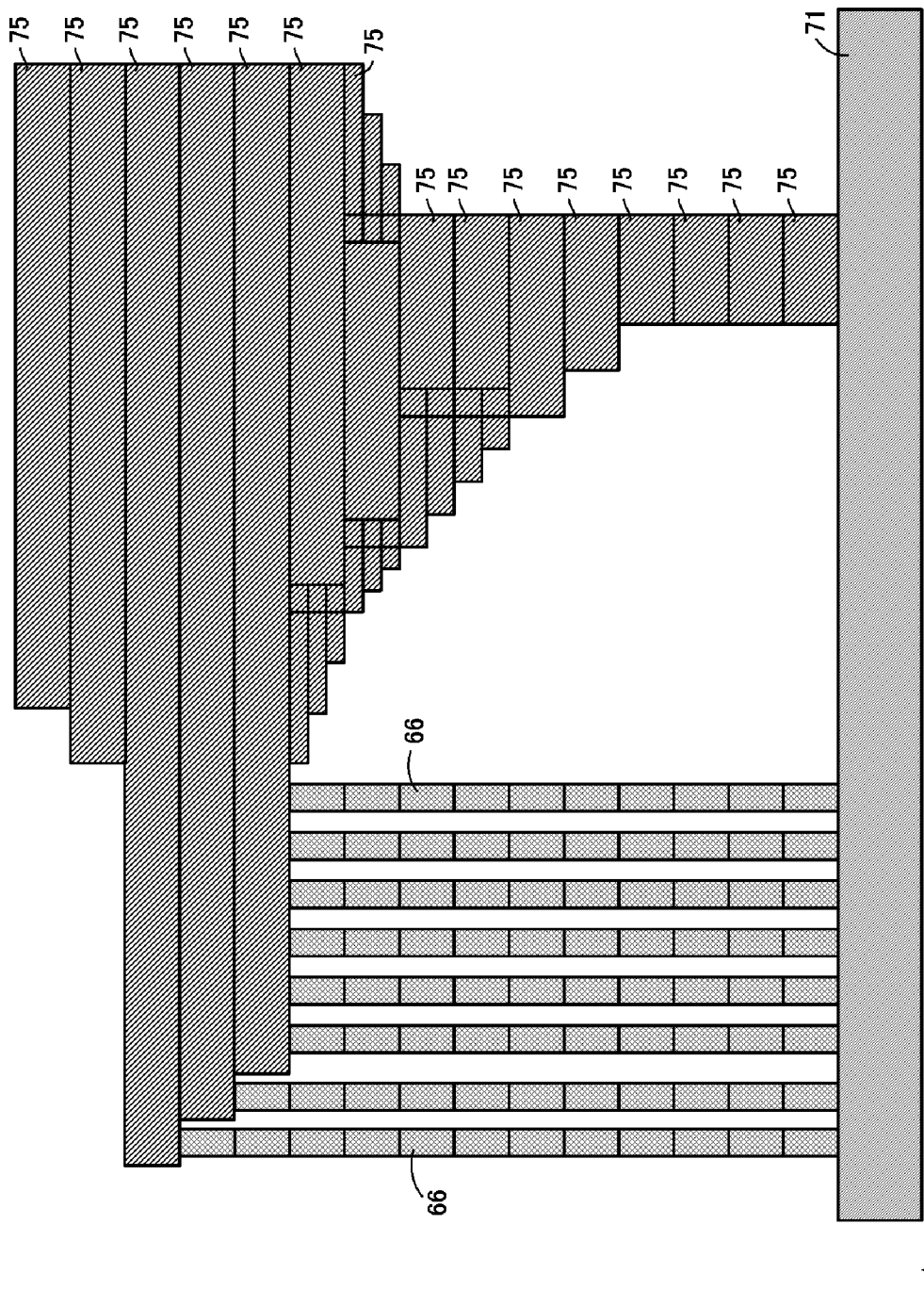
FIG. 22 illustrates an example of a three-dimensional object manufactured in accordance with an additive manufacturing program of the present embodiment.

By the above procedure, the formation of the solidified layer 75 pertaining to the normal divided layer 61 or the subdivided divided layer 62 is performed in order from the bottom, and the desired three-dimensional object illustrated in FIG. 22 is formed. If the additive manufacturing apparatus 1 includes the cutting device, every time a predetermined number of solidified layers 75 are formed, a cutting step may be performed in which an inner or outer side surface of the solidified layer 75 is subjected to cutting work.

As having been specifically shown in several examples, the disclosure is not limited to the configurations of the embodiments shown in the drawings, and various modifications or applications are possible without departing from the technical idea of the disclosure.

What is claimed is:

1. A method for additive manufacturing comprising:
   a program preparing step to prepare an additive manufacturing program comprising:
   a loading step, loading a three-dimensional model pertaining to a three-dimensional object that is desired;
   a dividing step, dividing the three-dimensional model into a plurality of divided layers at a normal lamination pitch of a predetermined size in a lamination direction;
   an overhang calculating step, calculating an overhang angle or an overhang length with respect to each of the plurality of divided layers, the overhang angle being an inclination angle of an overhang portion being a portion horizontally protruding with respect to the divided layer directly underneath, the overhang length being a horizontal length of the overhang portion;
   a determining step, including comparing the overhang angle with a first angle threshold or comparing the overhang length with a first length threshold with respect to each of the plurality of divided layers;
   a subdividing step performed in response to the overhang angle of a predetermined divided layer being less than a first angle threshold or the overhang length of the predetermined divided layer being equal to or greater than a first length threshold, subdividing at least a part of the predetermined divided layer comprising the overhang portion into two or more divided layers in the lamination direction; and
   an outputting step, outputting the additive manufacturing program in which a command pertaining to additive manufacturing is defined based on a shape of each divided layer; and
   a layer forming step, repeating a material layer forming step and a solidified layer forming step to manufacture the three-dimensional object, wherein
   in the material layer forming step, a material layer made of a powder material is formed on a build region being a region for manufacturing the three-dimensional object, and
   in the solidified layer forming step, the material layer is irradiated with a laser beam or an electron beam to form a solidified layer.

2. The method for additive manufacturing according to claim 1, wherein
   in the subdividing step, the predetermined divided layer is subdivided into two or more divided layers at a subdivision lamination pitch obtained by dividing the normal lamination pitch by an integer of 2 or more.

3. The method for additive manufacturing according to claim 1, wherein
   in the subdividing step, number of divisions of the predetermined divided layer differs depending on a size of the overhang angle or the overhang length.

4. The method for additive manufacturing according to claim 1, wherein the program preparing step further comprises:
   an overhang portion setting step performed in response to the overhang angle of the predetermined divided layer being less than the first angle threshold or the overhang length of the predetermined divided layer being equal to or greater than the first length threshold, setting a region of the overhang portion with respect to the predetermined divided layer, wherein in the subdividing step, only a part of the predetermined divided layer comprising the overhang portion is subdivided into two or more divided layers.

5. The method for additive manufacturing according to claim 4, wherein the program preparing step further comprises:
an overlapped portion setting step after the overhang portion setting step, setting an overlapped portion being a region of a predetermined width at a position adjacent to the overhang portion, wherein
in the subdividing step, only the overhang portion and the overlapped portion of the predetermined divided layer are subdivided into two or more divided layers; and
an irradiation order setting step, with respect to the overhang portion and the overlapped portion located at a same height in a divided layer in which the subdividing step has been performed, setting an irradiation order so that the overlapped portion is irradiated with a laser beam or an electron beam earlier than the overhang portion.

6. The method for additive manufacturing according to claim 1, wherein the program preparing step further comprises:
a support structure adding step, in response to the overhang angle of the predetermined divided layer being less than a second angle threshold smaller than the first angle threshold or the overhang length of the predetermined divided layer being equal to or greater than a second length threshold greater than the first length threshold, adding a support structure supporting the predetermined divided layer to the three-dimensional model without subdividing the predetermined divided layer.

7. The method for additive manufacturing according to claim 6, wherein the program preparing step further comprises:
an exception setting step, optionally setting a divided layer for performing the support structure adding step regardless of the overhang angle or the overhang length.

8. An additive manufacturing apparatus, performing the method for additive manufacturing according to claim 1, the additive manufacturing apparatus comprising:
a material layer former, forming the material layer on the build region;
an irradiator, irradiating the material layer with the laser beam or the electron beam to form the solidified layer; and
a controller, controlling the material layer former and the irradiator based on the additive manufacturing program.

9. The additive manufacturing apparatus according to claim 8, wherein
the material layer former comprises:
a build table, provided in the build region and configured to be vertically movable;
a recoater head, configured to be horizontally reciprocable on the build table, moving between a first position and a second position set across the build region;
a first blade, attached to a first side surface being a surface of the recoater head facing the second position, leveling the material discharged into the build region; and
a second blade, attached to a second side surface being a surface of the recoater head facing the first position, leveling the material discharged into the build region,
wherein the recoater head comprises:
a material container, storing the material;
a material supply port, provided on an upper surface of the material container and serving as a receiving port for the material supplied to the material container; and
a material discharge port, provided on a bottom surface of the material container and discharging the material in the material container;
wherein the second blade is provided so that a lower end of the second blade is located higher than a lower end of the first blade and lower than the material discharge port;
wherein in forming one of the material layer, the controller controls the recoater head to move from the first position to the second position and then move from the first position to the second position.

10. The method for additive manufacturing according to claim 1, wherein the program preparing step further comprises:
a maintaining step performed in response to the overhang angle of the predetermined divided layer being equal to or greater than the first angle threshold or the overhang length of the predetermined divided layer being less than the first length threshold, neither subdividing the predetermined divided layer nor adding a support structure that supports the predetermined divided layer.

* * * * *